(12) United States Patent
Lee et al.

(10) Patent No.: US 12,058,602 B2
(45) Date of Patent: Aug. 6, 2024

(54) ELECTRONIC DEVICE SUPPORTING MULTIPLE SIMs AND METHOD FOR OPERATING THEREOF

(71) Applicant: Samsung Electronics Co., Ltd., Suwon-si (KR)

(72) Inventors: Sanghyun Lee, Suwon-si (KR); Hyunsung Go, Suwon-si (KR); Sungjuhn Park, Suwon-si (KR); Eunsoo Bae, Suwon-si (KR); Byeongho Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/484,340

(22) Filed: Sep. 24, 2021

(65) Prior Publication Data

US 2022/0104103 A1 Mar. 31, 2022

Related U.S. Application Data

(63) Continuation of application No. PCT/KR2021/013014, filed on Sep. 24, 2021.

(30) Foreign Application Priority Data

Sep. 25, 2020 (KR) .................. 10-2020-0125207

(51) Int. Cl.
*H04W 40/36* (2009.01)
*H04W 36/00* (2009.01)
*H04W 36/08* (2009.01)

(52) U.S. Cl.
CPC ....... *H04W 40/36* (2013.01); *H04W 36/0058* (2018.08); *H04W 36/00837* (2018.08); *H04W 36/08* (2013.01)

(58) Field of Classification Search
CPC ..... H04W 88/06; H04W 48/18; H04W 8/183; H04W 8/18; H04W 76/15; H04W 84/12;
(Continued)

(56) References Cited

U.S. PATENT DOCUMENTS 5,999,811 A 12/1999 Mölne
2014/0140287 A1* 5/2014 Cheng .................. H04W 76/10
370/329
(Continued)

FOREIGN PATENT DOCUMENTS

KR 10-1999-0082642 A 11/1999
KR 10-2015-0107808 A 9/2015
(Continued)

OTHER PUBLICATIONS

Vivo (Moderator), "Report of phase 1 Multi-SIM email discussion", 3GPP TSG-RAN WG Meeting #85 Newport Beach, USA, Sep. 16-20, 2019, RP-191898, Sep. 9, 2019.
(Continued)

*Primary Examiner* — Kharye Pope
(74) *Attorney, Agent, or Firm* — Jefferson IP Law, LLP

(57) ABSTRACT

An electronic device is provided. The electronic device includes at least one processor. The at least one processor may be configured to select at least one first RF path, perform first communication based on the at least one first RF path, identify at least one second RF path simultaneously available with the at least one first RF path, and perform second communication based on the at least one second RF path. A first baseband signal may be converted into a first RF signal and a first communication signal corresponding to the first RF signal may be radiated based on the at least one first RF path, and a second baseband signal may be converted into a second RF signal and a second communication signal
(Continued)

corresponding to the second RF signal may be radiated based on the at least one second RF path.

18 Claims, 22 Drawing Sheets

(58) Field of Classification Search
CPC ... H04W 76/10; H04W 76/27; H04W 84/042; H04W 36/14
See application file for complete search history.

(56) References Cited

U.S. PATENT DOCUMENTS

| | | | |
|---|---|---|---|
| 2014/0194157 A1 | 7/2014 | Ezekiel et al. | |
| 2014/0199993 A1 | 7/2014 | Dhanda et al. | |
| 2014/0273974 A1 | 9/2014 | Varghese et al. | |
| 2015/0281929 A1* | 10/2015 | Shih | H04W 76/50 455/552.1 |
| 2015/0312717 A1* | 10/2015 | Shih | H04W 4/025 455/456.1 |
| 2016/0014578 A1* | 1/2016 | Kadiyala | H04W 4/06 455/414.1 |
| 2016/0014579 A1* | 1/2016 | Kasilya Sudarsan | H04W 76/15 455/553.1 |
| 2016/0021660 A1 | 1/2016 | Krishnamurthy | |
| 2016/0295550 A1* | 10/2016 | Sharma | H04W 48/20 |
| 2016/0345244 A1* | 11/2016 | Chuttani | H04W 48/16 |
| 2017/0048773 A1* | 2/2017 | Miao | H04B 1/3816 |
| 2020/0137755 A1 | 4/2020 | Lee et al. | |
| 2020/0267533 A1* | 8/2020 | Zhang | H04W 4/80 |
| 2020/0374785 A1* | 11/2020 | Li | H04W 8/24 |
| 2021/0051553 A1* | 2/2021 | Wei | H04W 8/186 |
| 2021/0266801 A1* | 8/2021 | Shah | H04W 36/0058 |
| 2022/0191682 A1* | 6/2022 | Li | H04W 36/30 |

FOREIGN PATENT DOCUMENTS

| | | |
|---|---|---|
| KR | 10-2015-0131236 A | 11/2015 |
| KR | 10-2020-0046480 A | 5/2020 |
| KR | 10-2020-0104665 A | 9/2020 |
| WO | 2013/007869 A1 | 1/2013 |

OTHER PUBLICATIONS

International Search Report dated Dec. 17, 2021, issued in International Application No. PCT/KR2021/013014.
Written Opinion dated Dec. 17, 2021, issued in International Application No. PCT/KR2021/013014.
Extended European Search Report dated Feb. 26, 2024; European Appln. No. 21872931.7-1216 / 4221457 PCT/KR2021013014.

\* cited by examiner

ELECTRONIC DEVICE SUPPORTING MULTIPLE SIMs AND METHOD FOR OPERATING THEREOF

CROSS-REFERENCE TO RELATED APPLICATION(S)

This application is a continuation application, claiming priority under § 365(c), of an International application No. PCT/KR2021/013014, filed on Sep. 24, 2021, which is based on and claims the benefit of a Korean patent application number 10-2020-0125207, filed on Sep. 25, 2020, in the Korean Intellectual Property Office, the disclosure of which is incorporated by reference herein in its entirety.

TECHNICAL FIELD

The disclosure relates to an electronic device supporting a plurality of subscriber identity modules (SIMs) and a method for operating the same.

BACKGROUND ART

In a wireless communication system, an electronic device (e.g., user equipment (UE)) may access a wireless communication network and use a voice communication or data communication service in a fixed position or on the move. To provide a communication service to an electronic device, an appropriate authentication process is required. In general, a universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and USIM in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an appropriate authentication process may be performed with the server the mobile network operator, which stores the same value, using to the international mobile subscriber identity (IMSI) value stored in the UICC and the encryption key value for authentication. After the appropriate authentication process is performed, the wireless communication service may be used.

An electronic device may support two or more SIMs. An electronic device supporting two SIMs may be called a dual SIM electronic device, and an electronic device supporting multiple SIMs may be called a multi-SIM electronic device. A dual SIM or multi-SIM electronic device may support a plurality of SIMs. Each SIM may be associated with a different subscription. Signals associated with the plurality of SIMs may be transmitted/received to and from the network by the electronic device. A mode in which signals individually associated with the plurality of SIMs cannot be simultaneously transmitted/received may be referred to as a dual SIM dual standby (DSDS) mode. In the DSDS mode, while signals are transmitted or received based on either of the SIMs, signals cannot be transmitted or received based on the other SIM and, thus, the other SIM may stay in standby mode. A mode in which signals individually associated with the plurality of SIMs can be transmitted/received at substantially the same time may be referred to as a dual SIM dual active (DSDA) mode. In the DSDA mode, while signals are transmitted or received based on one of the SIMs, signal transmission or reception based on the other SIM is possible, and both the SIMs may be activated at the same time.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may support a plurality of radio frequency (RF) paths. For a first SIM, a first RF path may be selected from among the plurality of RF paths and, for a second SIM, a second RF path may be selected from among the plurality of RF paths. The first RF path corresponding to the first SIM and the second RF path corresponding to the second SIM may, or may not be, capable of simultaneous operation. To operate in the DSDA mode, it may be required that the first RF path through which signals are transmitted/received based on the first SIM and the second RF path through which signals are transmitted/received based on the second SIM be capable of simultaneous operation. If the first RF path through which signals are transmitted/received based on the first SIM and the second RF path through which signals are transmitted/received based on the second SIM are incapable of simultaneous operation, the electronic device may be required to operate in the DSDS mode. Since selection of an RF path capable of simultaneous operation has not been considered, such an occasion may arise in which the electronic device operates in the DSDS mode although it is able to operate in the DSDA mode. Since operation in the DSDS mode requires that communication associated with the first SIM and communication associated with the second SIM be time-divisionally performed, use of communication may be limited.

Aspects of the disclosure are to address at least the above-mentioned problems and/or disadvantages and to provide at least the advantages described below. Accordingly, an aspect of the disclosure is to provide an electronic device and a method for operating the same may select RF paths capable of simultaneous operation and perform communication associated with each of the first SIM and the second SIM through each of the selected RF paths.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device may include at least one processor configured to select at least one first RF path from among a plurality of RF paths supported by the electronic device, perform first communication associated with a first SIM based on the at least one first RF path, identify at least one second RF path simultaneously available with the at least one first RF path among the plurality of RF paths, and perform second communication associated with a second SIM based on at least part of the at least one second RF path. A first baseband signal associated with the first SIM may be converted into a first RF signal associated with the first SIM and a first communication signal corresponding to the first RF signal may be radiated based on at least one first hardware corresponding to the at least one first RF path, and a second baseband signal associated with the second SIM may be converted into a second RF signal associated with the second SIM and a second communication signal corresponding to the second RF signal may be radiated based on at least one second hardware corresponding to the at least one second RF path.

In accordance with another aspect of the disclosure, an electronic device is provided. The electronic device may include at least one processor configured to select at least one first frequency from among a plurality of frequencies supported by the electronic device, perform first communication associated with a first SIM based on the at least one first frequency, identify at least one second frequency simultaneously available with the at least one first frequency among the plurality of frequencies based on information indicating whether frequency combinations by two of the plurality of frequencies supported by the electronic device are simultaneously available, and perform second communication associated with a second SIM based on at least one of the at least one second frequency.

Advantageous Effects

In accordance with another aspect of the disclosure, an electronic device and a method for operating the same are provided. The electronic device and the method may select RF paths capable of simultaneous operation and perform communication associated with each of the first SIM and the second SIM through each of the selected RF paths. Accordingly, as it is possible to operate in the DSDA mode, communication associated with each of the first SIM and the second SIM may be performed without limitation.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" may include reference to one or more of such surfaces.

Figure 1A:
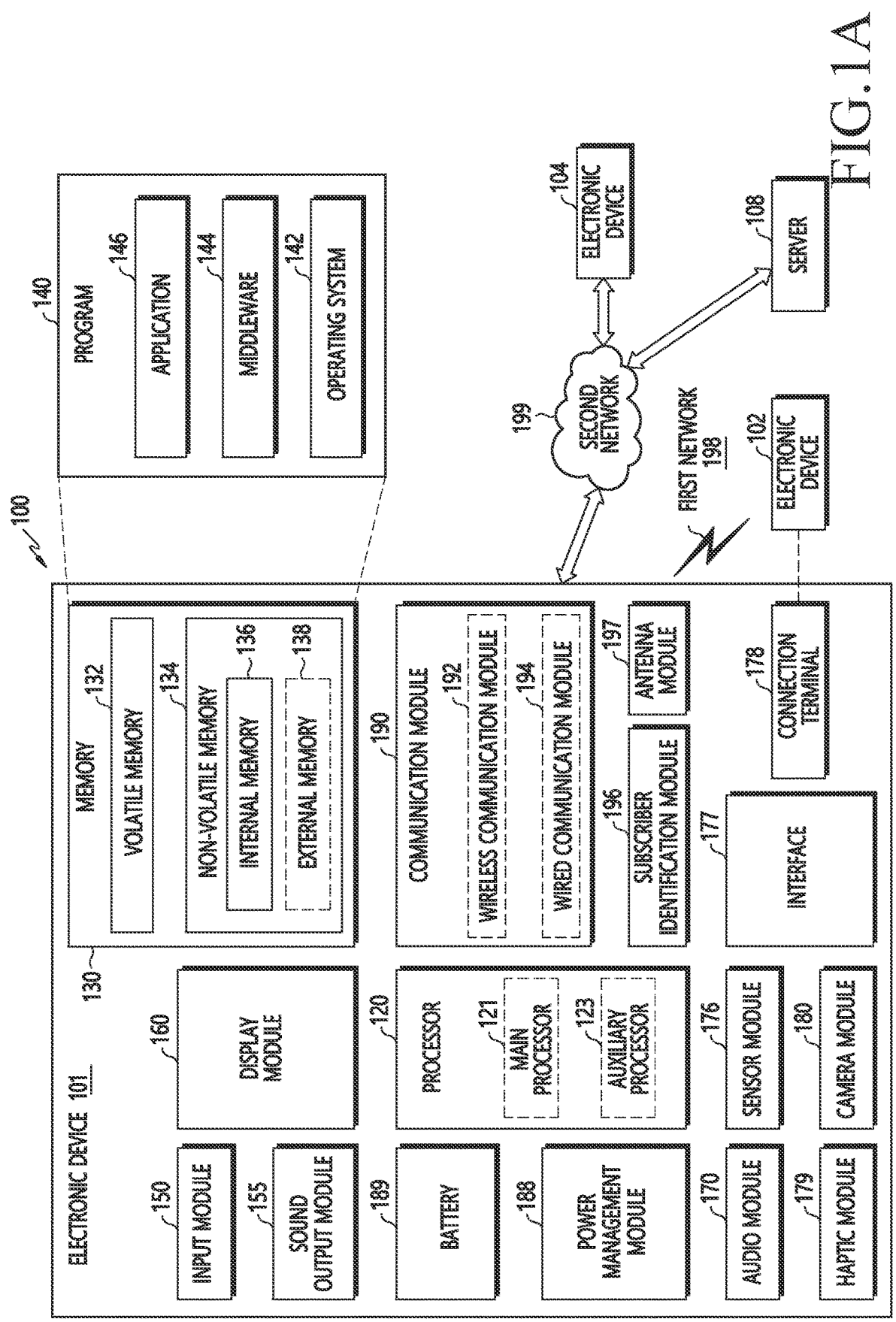
FIG. 1A is a block diagram illustrating an electronic device in a network environment according to an embodiment of the disclosure.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
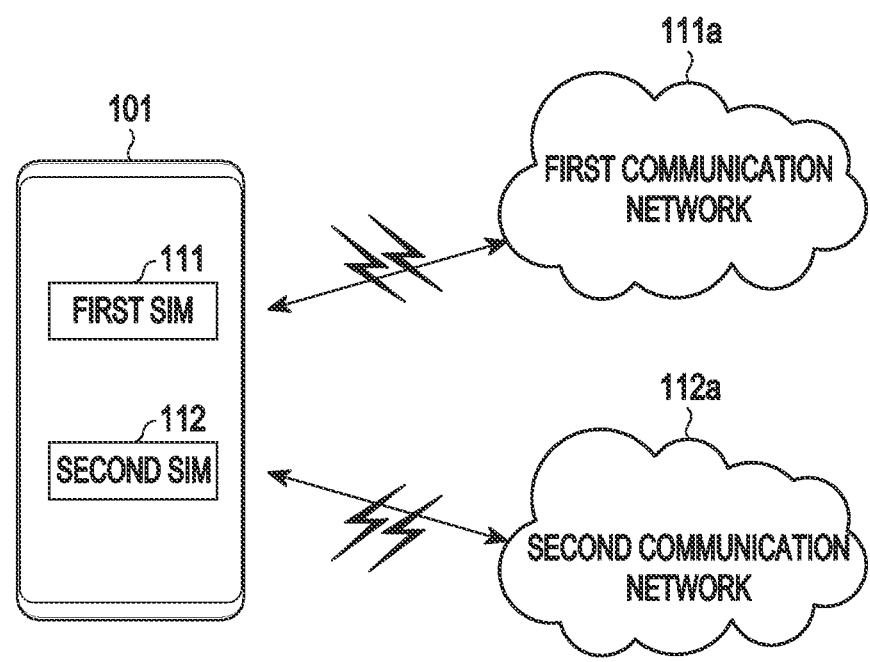
FIG. 1B is a view illustrating a network environment including an electronic device according to an embodiment of the disclosure.

FIG. 1B is a view illustrating a network environment 100 including an electronic device according to an embodiment of the disclosure.

Referring to FIG. 1B, according to various embodiments of the disclosure, a network (e.g., the second network 199 of FIG. 1A) may include an electronic device 101, a first communication network 111a, or a second communication network 112a.

According to various embodiments, the electronic device 101 may operate in a dual SIM dual standby (DSDS) mode or a dual SIM dual active (DSDA) mode supporting two SIMs in one device. For example, the electronic device 101 may include two SIMs, e.g., a first SIM 111 and a second SIM 112. The types of the first SIM 111 and the second SIM 112 are not limited. For example, the first SIM 111 and the second SIM 112 may be removable SIMs (rSIMs) (e.g., SIM cards). For example, the electronic device 101 may include a first slot (not shown) and a second slot (not shown), which are first structures, to receive the first SIM 111 and the second SIM 112, respectively. In this case, it will be appreciated by one of ordinary skill in the art that when the electronic device 101 includes the first SIM 111 and the second SIM 112, this may mean that the first SIM 111 and the second SIM 112 are mounted in the electronic device 101 but may not mean that the first SIM 111 and the second SIM 112 are necessarily included in the electronic device 101. As another example, at least one of the first SIM 111 and the second SIM 112 may include an embedded subscriber identity module (eSIM). The eSIM may be referred to as an eUICC.

The first SIM 111 may be a SIM which has a subscription to the mobile network operator of the first communication network 111a. The electronic device 101 may access the first communication network 111a using the first SIM 111 to receive the wireless communication service. The second SIM 112 may be a SIM having a subscription to the mobile network operator of the second communication network 112a. The electronic device 101 may access the second communication network 112a using the second SIM 112 to receive the wireless communication service. As another example, although not shown, the first SIM 111 and the second SIM 112 may be SIMs having a subscription to the mobile network operator of the same communication network. For example, the operators of the first communication network and the second communication network may be the same. For example, the first SIM 111 and the second SIM 112 may be SIMs corresponding to different subscriber information and having subscription to the same mobile network operator.

Figure 2A:
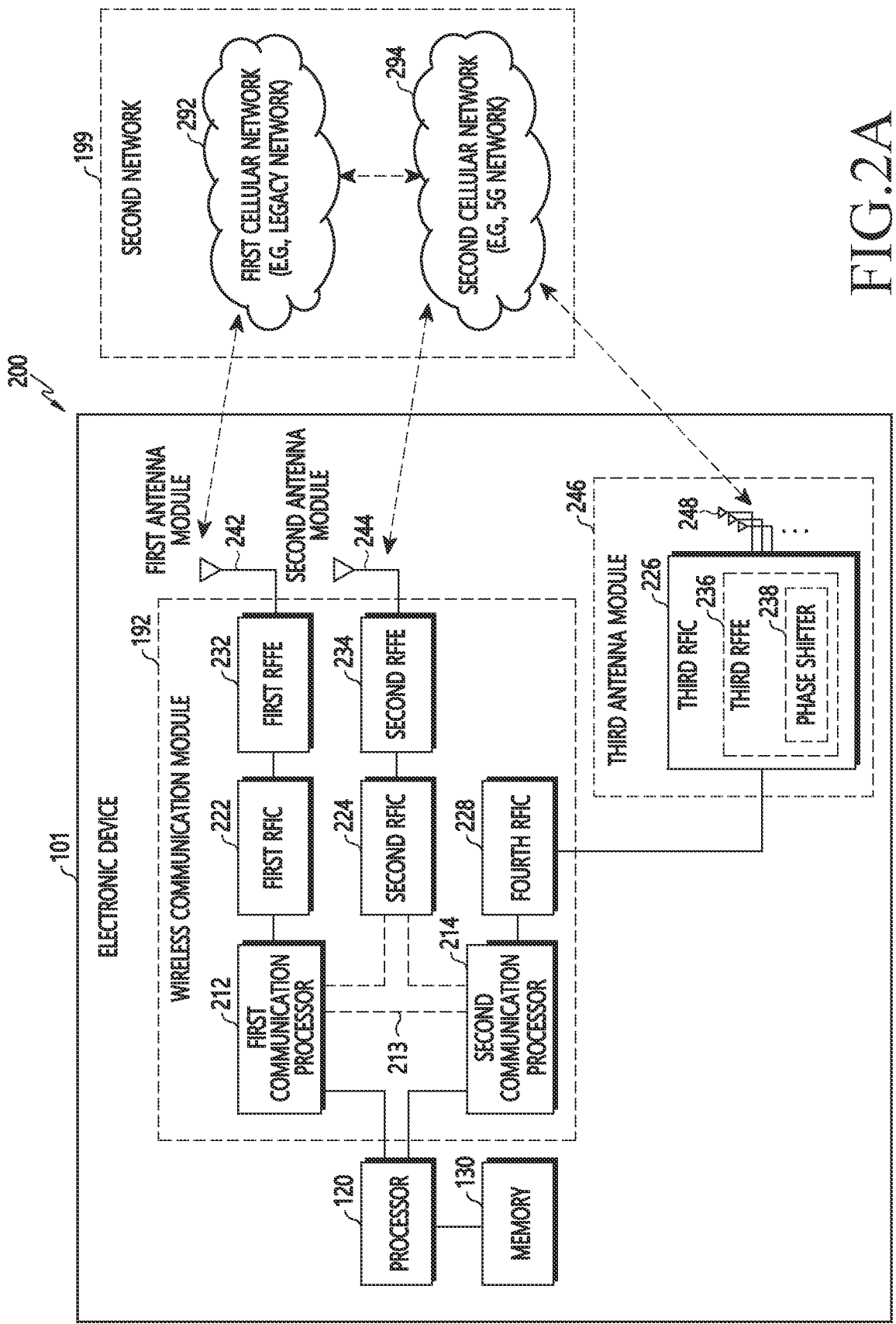
FIG. 2A is a block diagram illustrating an electronic device for supporting legacy network communication and fifth generation (5G) network communication according to an embodiment of the disclosure.

FIG. 2A is a block diagram 200 illustrating an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment of the disclosure, the electronic device 101 may further include at least one component among the components of FIGS. 1A and 1B, and the second network 199 may further include at least one other network. The first communication processor 212, the second communication processor 214, the first RFIC 222, the second RFIC 224, the fourth RFIC 228, the first RFFE 232, and the second RFFE 234 may form at least part of the wireless communication module 192. The fourth RFIC 228 may be omitted or be included as part of the third RFIC 226.

The first communication processor 212 may establish a communication channel of a band that is to be used for wireless communication with the first cellular network 292 or may support legacy network communication via the established communication channel. The first cellular network may be a legacy network that includes second generation (2G), third generation (3G), fourth generation (4G), or long-term evolution (LTE) networks. The second CP 214 may establish a communication channel corresponding to a designated band (e.g., from about 6 gigahertz (GHz) to about 60 GHz) among bands that are to be used for wireless communication with the second cellular network 294 or may support fifth generation (5G) network communication via the established communication channel. The second cellular network 294 may be a 5G network defined by the 3rd generation partnership project (3GPP). Additionally, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various information, such as sensing information, output strength information, or resource block (RB) allocation information, to/from the second communication processor 214.

According to some implementations, the first communication processor 212 may not be directly connected with the second communication processor 214. In this case, the first communication processor 212 may transmit/receive data to/from the second communication processor 214 via the processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. The first communication processor 212 or the second communication processor 214, along with the processor 120, an assistance processor 123, or communication module 190, may be formed in a single chip or single package. For example, referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment of the disclosure, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

Figure 2B:
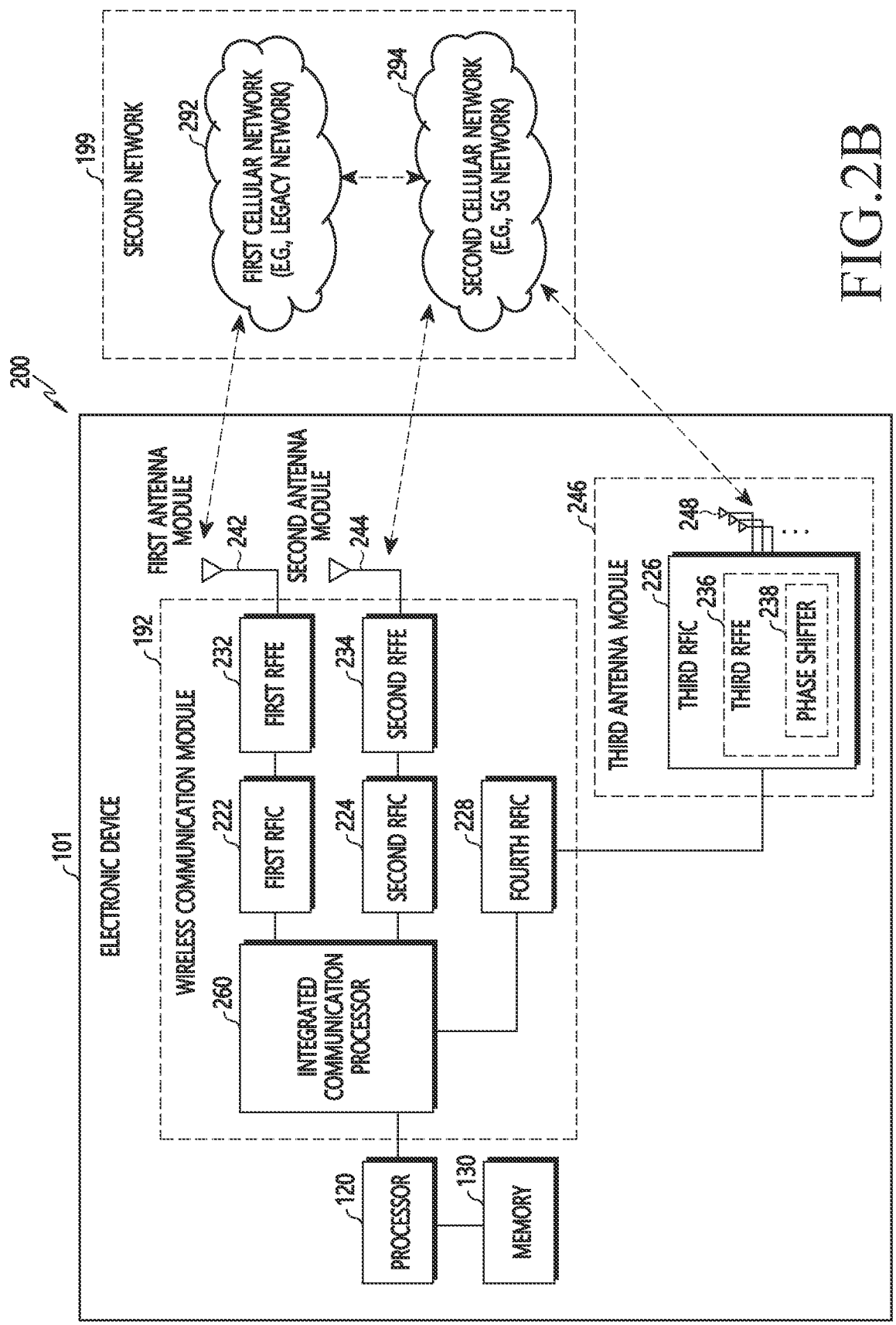
FIG. 2B is a block diagram illustrating an electronic device for supporting legacy network communication and 5G network communication according to an embodiment of the disclosure.

According to an embodiment of the disclosure, the first RFIC 222 and the second RFIC 224 may be implemented as at least part of a single chip or single package. When the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. The first RFFE 232 and the second RFFE 234 may be implemented as at least part of a single chip or single package. At least one of the first antenna module 242 or the second antenna module 244 may be omitted or be combined with another antenna module to process multi-band RF signals.

According to an embodiment of the disclosure, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment of the disclosure, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
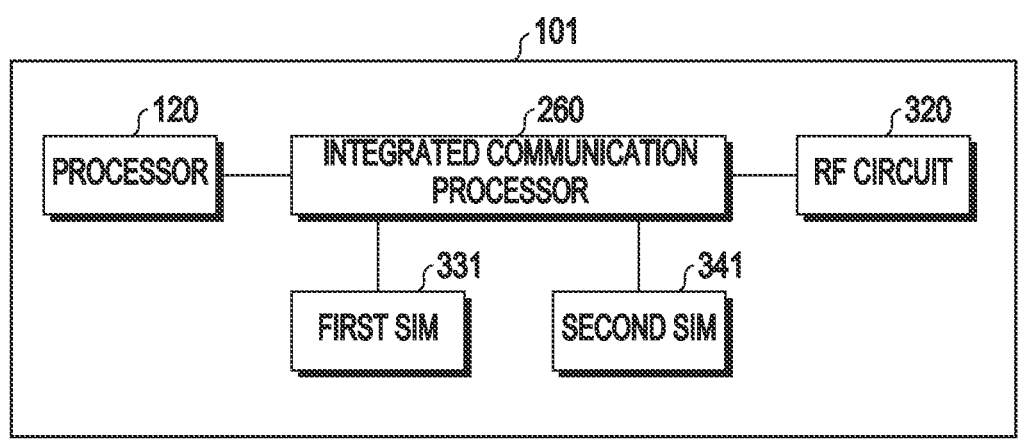
FIG. 3 is a block diagram illustrating an electronic device according to an embodiment of the disclosure.

FIG. 3 is a block diagram illustrating an electronic device according to an embodiment of the disclosure.

Referring to FIG. 3, the electronic device 101 may include at least one of a processor 120, an integrated communication processor 260, an RF circuit 320, a first SIM 331, or a second SIM 341. At least one of the first SIM 331 or the second SIM 341 may be an rSIM. In this case, the electronic device 101 may further include at least one slot for connection with the rSIM. Further, as described above, the rSIM is detachable from the electronic device 101 and is not necessarily a component of the electronic device 101. At least one of the first SIM 331 or the second SIM 341 may be an eSIM.

According to various embodiments of the disclosure, the integrated communication processor 260 may support a designated number (e.g., two) of SIMs. It will be appreciated by one of ordinary skill in the art that in place of the integrated communication processor 260, a first communication processor (e.g., the first communication processor 212 of FIG. 2A) and a second communication processor (e.g., the second communication processor 214 of FIG. 2A) may be implemented in the electronic device 101. Although not shown, the electronic device 101 may include more than the designated number of SIMs (e.g., two rSIMs and one eSIM). In this case, the electronic device 101 may further include a switch (not shown) for switching SIM connections between the plurality of SIMs and the integrated communication processor 260.

According to various embodiments of the disclosure, the integrated communication processor 260 may establish a communication channel of a band that is to be used for wireless communication or may support network communication via the established communication channel. For example, the integrated communication processor 260 may support at least one of second generation (2G), 3G, 4G, or 5G network communication. The RF circuit 320 may include, e.g., at least one of an RFIC, an RFFE, or an antenna module. The RF circuit 320 may process data (e.g., a baseband signal) output from the integrated communication processor 260 into an RF signal and transmit it through an antenna module. The RF circuit 320 may convert the RF signal, received through the antenna module, into a baseband signal and transfer the converted signal to the integrated communication processor 260. The RF circuit 320 may process RF signals or baseband signals according to the communication scheme supported by the integrated communication processor 260, and the type of the RF circuit 320 is not limited. Interfaces between the components may be implemented as, e.g., a GPIO, UART (e.g., HS-UART or PCIe interface), but are not limited to a specific type. Alternatively, at least some of the components may exchange control information or packet data information using, e.g., a shared memory. In the embodiment shown in FIG. 3, the processor 120 and the integrated communication processor 260 are shown as different hardware, but this is merely exemplary. The processor 120 and the integrated communication processor 260 may be different hardware but, according to another embodiment, the processor 120 and the integrated communication processor 260 may be implemented in a single chip.

The integrated communication processor 260 may obtain stored information from the first SIM 331 and the second SIM 341. For example, the stored information may include at least one of the integrated circuit card identifier (ICCID), IMSI, home public land mobile network (HPLMN)-related information, or mobile subscriber international ISDN number (MSSIDN). The stored information may be referred to as an elementary file (EF). The integrated communication processor 260 may perform, through the RF circuit 320, an authentication procedure for network communication corresponding to the first SIM 331 and/or the second SIM 341, based on the obtained information stored in the first SIM 331 and/or the second SIM 341. If authentication is successful, the integrated communication processor 260 may perform network communication corresponding to the first SIM 331 and/or the second SIM 341 through the RF circuit 320.

According to various embodiments of the disclosure, the integrated communication processor 260 may perform dual SIM network communications according to the first SIM 331 or the second SIM 341. The RF circuit 320 may provide a plurality of RF paths. According to selection of the RF path, the dual SIM may be performed in either the DSDS mode or the DSDA mode. The integrated communication processor 260 may select an RF path corresponding to the first SIM 331 and an RF path corresponding to the second SIM 341 so that the first SIM 331 and the second SIM 341 may operate in the DSDA mode. For example, the integrated communication processor 260 may identify a first RF path corresponding to the first SIM 331 and a second RF path capable of simultaneous operation. The integrated communication processor 260 may perform a search for a frequency corresponding to the second RF path in a cell selection operation for the second SIM 341 prior to other frequency. For example, the integrated communication processor 260 may perform a search for a frequency band corresponding to the second RF path in a cell reselection operation for the second SIM 341 prior to other frequency or adjust the cell reselection priority for a cell (or frequency band) corresponding to the second RF path. For example, if the DSDA mode operation is possible, the integrated communication processor 260 may keeping camping on the cell corresponding to the second SIM 341 (e.g., the cell camped on using the second SIM 341).

According to various embodiments of the disclosure, the integrated communication processor 260 may include two protocol stacks (e.g., protocol stacks according to ISO7816) for processing the SIM. The first SIM 331 and the second SIM 332 may be connected to two protocol stacks. For example, a first slot 330 may be connected to one protocol stack, and a second slot 340 may be connected to the other protocol stack.

Figure 4A:
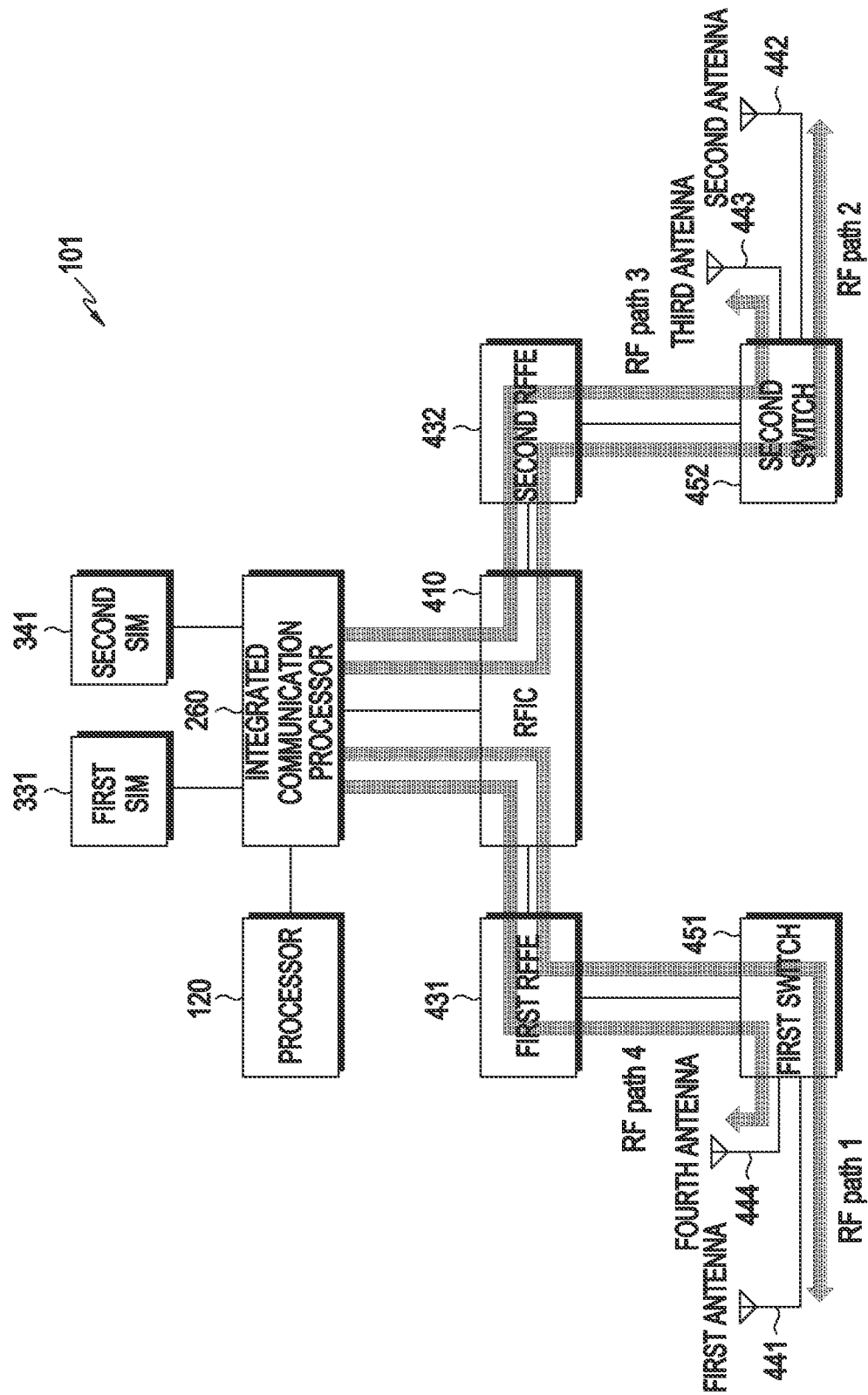
FIGS. 4A and 4B are block diagrams illustrating electronic devices according to various embodiments of the disclosure.
Figure 4B:
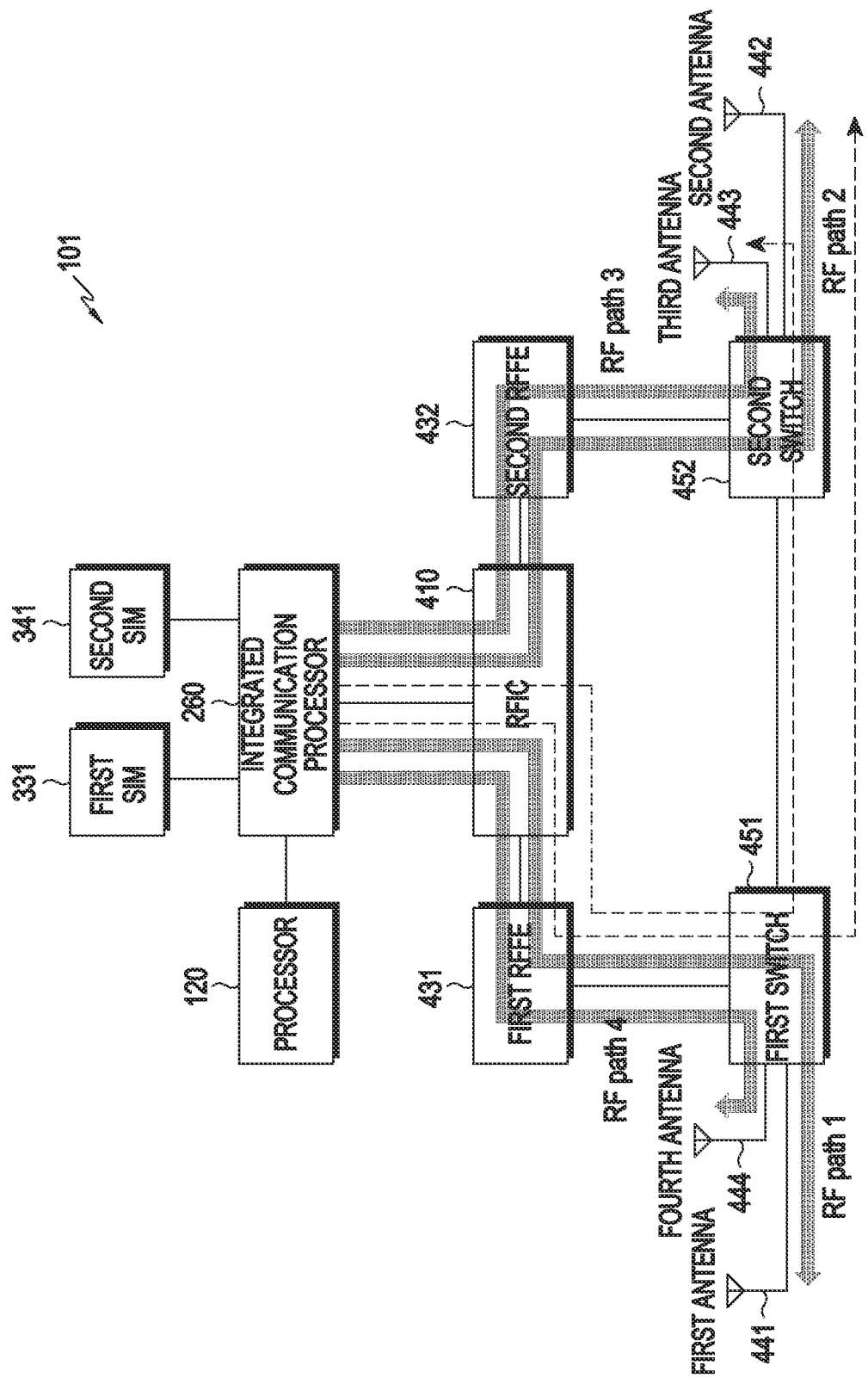

FIGS. 4A and 4B are block diagrams illustrating electronic devices according to various embodiments of the disclosure.

Referring to FIG. 4A, an electronic device (e.g., the electronic device 101 of FIGS. 1A and 1B) may include a processor 120, an integrated communication processor 260, an RFIC 410, a first RFFE 431, a second RFEE 432, a first antenna 441, a second antenna 442, a third antenna 443, a fourth antenna 444, a first switch 451, or a second switch 452. The first SIM 331 and the second SIM 341 may be connected to the integrated communication processor 260.

According to various embodiments of the disclosure, upon transmission, the RFIC 410 may convert a baseband signal generated by the integrated communication processor 260 into a radio frequency (RF) signal used in a first communication network (e.g., the first communication network 111a of FIG. 1B) or a second communication network (e.g., the second communication network 112a of FIG. 1B). For example, the RFIC 410 may transmit an RF signal used in the first communication network to the first antenna 441 or the fourth antenna 444 through the first RFFE 431 and the first switch 451. The RFIC 410 may transmit an RF signal used in the first communication network or the second communication network to the second antenna 442 or the third antenna 443 through the second RFFE 432 and the second switch 452. The RFIC 410 may transmit an RF signal corresponding to the first communication network to the first antenna 441 or the fourth antenna 444 through the first RFFE 431 and may transmit an RF signal corresponding to the second communication network to the second antenna 442 or the third antenna 443 through the second RFFE 432.

The transmission RF path of transmission from the RFIC 410 to the first antenna 441 through the first RFFE 431 and the first switch 451 may be referred to as a 'first RF path (RF path 1)'. The transmission RF path of transmission from the RFIC 410 to the fourth antenna 444 through the first RFFE 431 and the first switch 451 may be referred to as a 'fourth RF path (RF path 4)'. As used herein, RF path may refer to, e.g., a path in which the baseband signal output from the integrated communication processor 260 is converted into an RF signal, and the RF signal is radiated as a physical communication signal through at least one of the antennas 441, 442, 443, and 444, or at least one piece of hardware associated with the RF path. Performing communication based on a specific RF path may include transmitting and/or receiving a signal through at least some hardware included in the specific RF path. Alternatively, performing communication based on a specific RF path may include at least one first operation to enable at least one piece of first hardware (e.g., an RFIC and/or RFFE) associated with the specific RF path to operate and/or a second operation (e.g., controlling the on/off of at least one switch) to control at least one piece of second hardware (e.g., an antenna) associated with the specific RF path to connect to the RF path.

According to various embodiments of the disclosure, upon transmission, the RFIC 410 may convert a baseband signal generated by the integrated communication processor 260 into a radio frequency (RF) signal used in the first communication network or the second communication network. For example, the RFIC 410 may transmit an RF signal used in the first communication network or the second communication network to the second antenna 442 or the third antenna 443 through the second RFFE 432 and the second switch 451.

According to various embodiments of the disclosure, the transmission RF path of transmission from the RFIC 410 to the second antenna 442 through the first RFFE 432 and the second switch 452 may be referred to as a 'second RF path (RF path 2)'. The transmission RF path of transmission from the RFIC 410 to the third antenna 443 through the second RFFE 432 and the second switch 452 may be referred to as a "third RF path (RF path 3)".

According to various embodiments of the disclosure, the first RF path (RF path 1) may be simultaneously available with the second RF path (RF path 2), may be simultaneously available with the third RF path (RF path 3), but may not be simultaneously available with the fourth RF path (RF path 4). The second RF path (RF path 2) may not be simultaneously available with the third RF path (RF path 3), may be simultaneously available with the first RF path (RF path 1), and may be simultaneously available with the fourth RF path (RF path 4). The third RF path (RF path 3) may not be simultaneously available with the second RF path (RF path 2), may be simultaneously available with the first RF path (RF path 1), and may be simultaneously available with the fourth RF path (RF path 4). The fourth RF path (RF path 4) may not be simultaneously available with the first RF path (RF path 1), may be simultaneously available with the third RF path (RF path 3), and may be simultaneously available with the second RF path (RF path 2). The electronic device 101 (e.g., the communication processor 260) may previously store information regarding whether simultaneous use between the above-described RF paths is possible in a memory (e.g., the memory 130 of FIGS. 1A and 1B). For example, the electronic device 101 may store information about simultaneous use as shown in Table 1.

TABLE 1

| | first RF path | second RF path | third RF path | fourth RF path |
|---|---|---|---|---|
| first RF path | N/A | Simultaneous use possible | Simultaneous use possible | Simultaneous use impossible |

TABLE 1-continued

|  | first RF path | second RF path | third RF path | fourth RF path |
|---|---|---|---|---|
| second RF path | Simultaneous use possible | N/A | Simultaneous use impossible | Simultaneous use possible |
| third RF path | Simultaneous use possible | Simultaneous use impossible | N/A | Simultaneous use possible |
| fourth RF path | Simultaneous use impossible | Simultaneous use possible | Simultaneous use possible | N/A |

In one example, if the first RF path (RF path 1) is allocated to the first SIM 331, the electronic device 101 may allocate either the third RF path (RF path 3) or the second RF path (RF path 2), which may be simultaneously available with the first RF path (RF path 1), to the second SIM 341. Accordingly, the first SIM 331 and the second SIM 341 may operate in the DSDA mode. If the fourth RF path (RF path 4) is allocated to the second SIM 341, the first SIM 331 and the second SIM 341 will operate in the DSDS mode.

According to various embodiments of the disclosure, the electronic device 101 may perform at least one operation to allocate either the third RF path (RF path 3) or the second RF path (RF path 2) to the second SIM 341. For example, the electronic device 101 may perform cell selection or cell reselection to be able to camp on a specific cell using the third RF path (RF path 3) or the second RF path (RF path 2). The electronic device 101 may previously store information regarding frequencies supported by each of the third RF path (RF path 3) and the second RF path (RF path 2). The electronic device 101 may perform an operation for selecting or reselecting the cell supporting the frequency corresponding to each of the third RF path (RF path 3) and the second RF path (RF path 2) based on the pre-stored information.

For example, the electronic device 101 may previously store information for the frequency per RF path as set forth in Table 2.

TABLE 2

| frequency | RF path | RF resource |
|---|---|---|
| first frequency | first RF path | first antenna 441 |
| second frequency | second RF path | second antenna 442 |
| third frequency | third RF path | third antenna 443 |
| fourth frequency | fourth RF path | fourth antenna 444 |

The electronic device 101 may store information including frequency bands (or frequency bandwidths) instead of or in addition to frequencies. It will be appreciated by those skilled in the art that, in various embodiments, frequencies may be used interchangeably with frequency bands. The electronic device 101 may store information including both the RF path and the RF resource as shown in Table 2, but may also store information including either the RF path or the RF resource. Meanwhile, although it is set forth in Table 2 as if one frequency is available for one antenna, this is exemplary, and for one antenna, multiple frequencies may be set to be available.

For example, it is assumed that the electronic device 101 allocates the first RF path (RF path 1) to the first SIM 331 and uses a first frequency. The allocation of the first RF path (RF path 1) may refer to, e.g., operating the hardware associated with the first RF path (RF path 1) and controlling the state of the switch such that a signal may be provided to the first RF path (RF path 1). The electronic device 101 may identify the third RF path (RF path 3) and the second RF path (RF path 2) that may be simultaneously available with the first RF path (RF path 1) based on the information shown in Table 1. The electronic device 101 may identify a frequency (e.g., a third frequency or a second frequency) corresponding to the selected RF path, based on information shown in Table 2, for example. The electronic device 101 may perform an operation for camping on the cell supporting the third frequency or second frequency for the second SIM 341. Alternatively, if the electronic device 101 has already camped on the cell supporting the third frequency or second frequency for the second SIM 341, the electronic device 101 may perform an operation to keep camping on.

According to various embodiments of the disclosure, the electronic device 101 may receive an RF signal through the first antenna 441 or the fourth antenna 444. The received RF signal may be transmitted to the integrated communication processor 260 via at least one RFIC. Further, the electronic device 101 may receive an RF signal through the second antenna 441 or the third antenna 444. The received RF signal may be converted into a baseband signal through at least one RFIC and transmitted to the integrated communication processor 260. If the first RF path (RF path 1) is allocated to the first SIM 331, the electronic device 101 may receive the RF signal for reception associated with the first SIM 331 through the first antenna 441 and/or the fourth antenna 444. If the second RF path (RF path 2) is allocated to the second SIM 341, the electronic device 101 may receive the RF signal for reception associated with the second SIM 341 through the second antenna 442 and/or the third antenna 443.

According to various embodiments of the disclosure, the first communication network and the second communication network may be communication networks corresponding to different radio access technologies (RATs). For example, the first communication network may be a 5G network, and the second communication network may be a legacy network (e.g., an LTE network). When the first communication network is a 5G network, one of the first RFFE 431 or the second RFFE 432 may be designed to be suitable for processing signals corresponding to the 5G network, and the other of the first RFFE 431 or the second RFFE 432 may be designed to be suitable for processing signals corresponding to the legacy network. The first communication network and the second communication network may be communication networks corresponding to the same RAT.

Referring to FIG. 4B, The first switch 451 and the second switch 452 may be connected with each other. Accordingly, the signal from the first RFFE 431 may be provided to at least some of the first antenna 441, the second antenna 442, the third antenna 443, or the fourth antenna 444 based on the on/off state of each of the sub switches included in the first switch 451 and the second switch 452. For example, the signal from the second RFFE 432 may be provided to at least some of the first antenna 441, the second antenna 442, the third antenna 443, or the fourth antenna 444 based on the on/off state of each of the sub switches included in the first switch 451 and the second switch 452. The signal received through the first antenna 441, the second antenna 442, the third antenna 443, or the fourth antenna 444 may be provided to any one of the first RFFE 431 or the second RFFE 432 based on the on/off state of each of the sub switches included in the first switch 451 and the second switch 452.

Figure 4C:
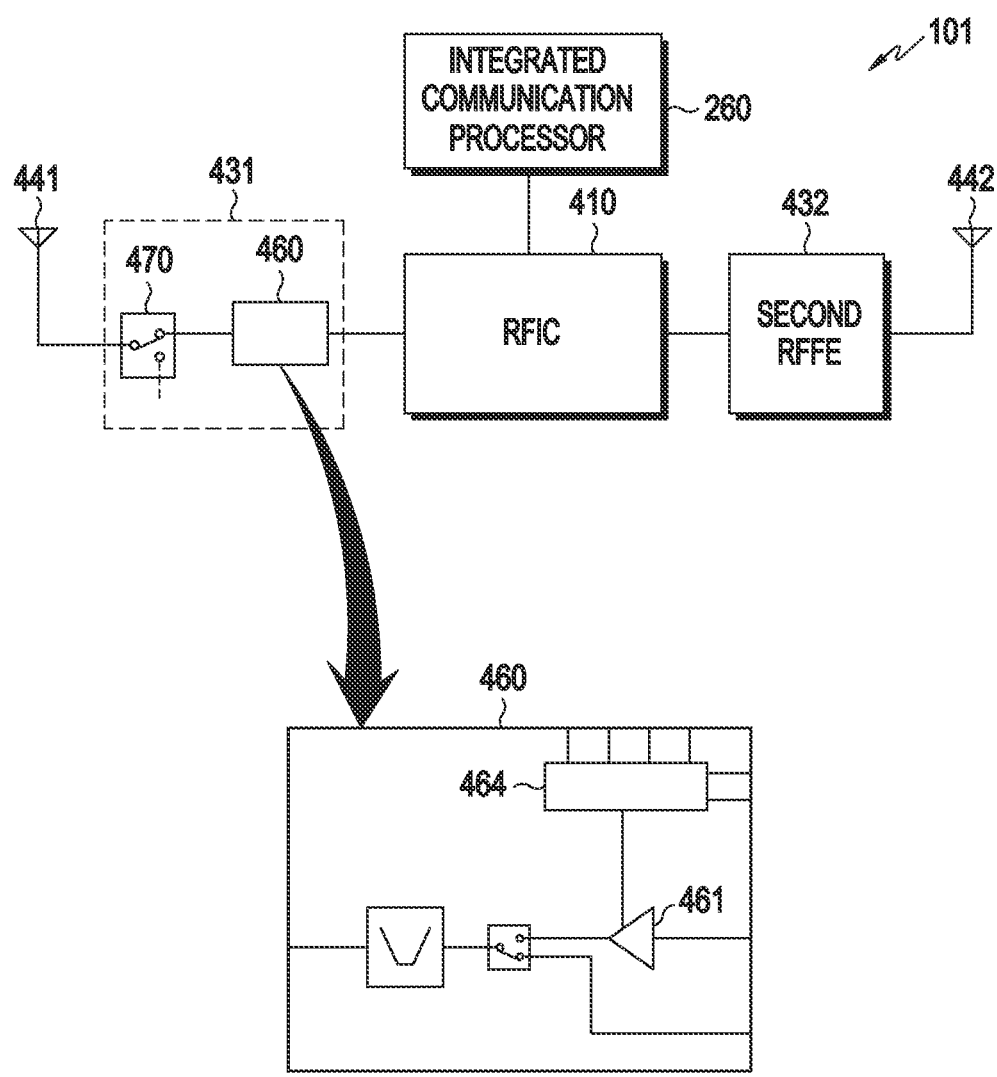
FIG. 4C is a block diagram illustrating in detail an electronic device according to an embodiment of the disclosure.

FIG. 4C is a block diagram illustrating in detail an electronic device according to an embodiment of the disclosure.

Referring to FIG. 4C, an electronic device (e.g., the electronic device 101 of FIGS. 1A and 1B) may include a communication processor 260, an RFIC 410, a first RFFE 431, a first antenna 441, a second RFEE 432, and a second antenna 442.

According to various embodiments of the disclosure, the first RFFE 431 may communicate with a 5G network. In this case, the first RFFE 431 may further include additional components different from the second RFFE 432, for signal processing suitable for the characteristics of the 5G network or for supporting multiple bands. For example, the first RFFE 431 may include a front end module (FEM) 460 and a first single pole double throw (SPDT) switch 470.

According to various embodiments of the disclosure, the FEM 460 may include a power amplifier (PA) 461 and a PA ET (envelop tracking IC) 464. The PA ET IC 464 may be included in the FEM 460 or may be connected with the FEM 460 outside the FEM 460 as illustrated in FIG. 4C. The PA ET IC 464 may control the Vcc of the PA 461 according to the control of the communication processor 260 or the RFIC 410. The PA ET IC 464 may operate in a plurality of modes (e.g., an envelope tracking (ET) mode, an average power tracking (APT) mode, and a maximum power mode (e.g., APT full bias or battery direct)) according to the control of the communication processor 260 or the RFIC 410.

Figure 5:
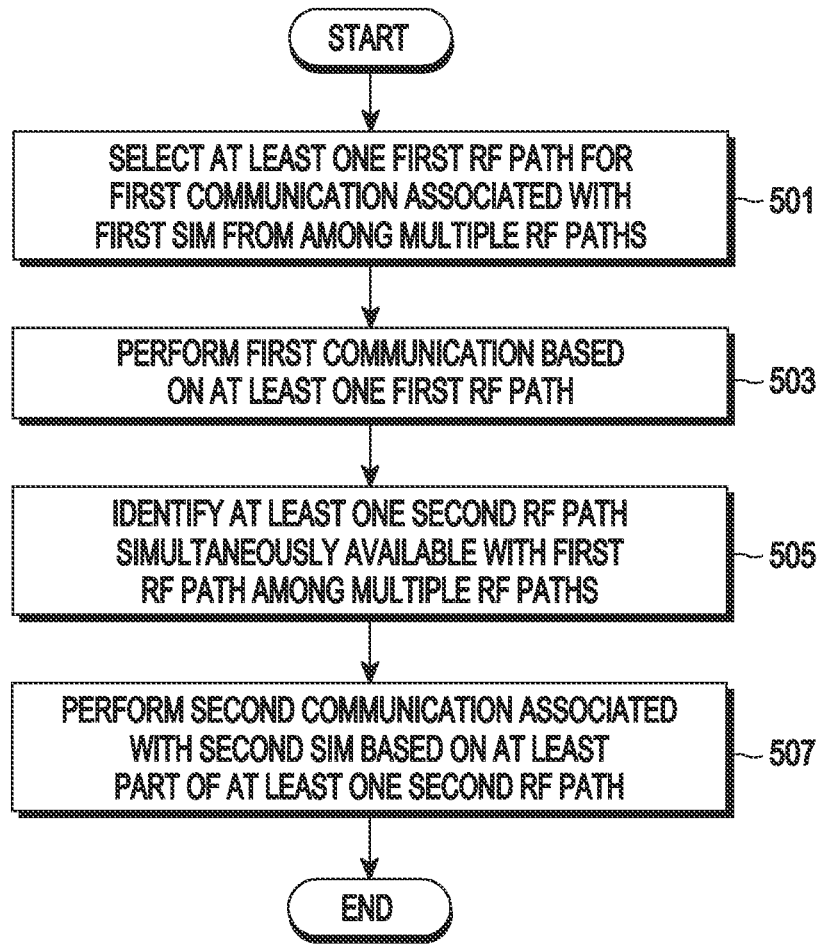
FIG. 5 is a flowchart illustrating an operation method of an electronic device according to an embodiment of the disclosure.

FIG. 5 is a flowchart illustrating an operation method of an electronic device according to an embodiment of the disclosure.

Referring to FIG. 5, an electronic device 101 (e.g., at least one of the processor 120, the first communication processor 212, the second communication processor 214, or the integrated communication processor 260) may select at least one first RF path for first communication associated with the first SIM 331 from among a plurality of RF paths in operation 501. The first communication associated with the first SIM 331 may refer to communication performed based on information for the first SIM 331. Selection of the first RF path may be performed to perform the first communication. For example, the electronic device 101 may perform a cell selection or cell reselection operation based on the first SIM 331. The cell selection or cell reselection operation may follow what has been proposed in the 3GPP but is not limited thereto. The electronic device 101 may identify an RF path corresponding to the selected frequency (or frequency band). The electronic device 101 may select and use an RF path corresponding to the identified frequency based on information regarding the RF path (or RF resource) to be used for each frequency, e.g., as shown in Table 2.

In operation 503, the electronic device 101 may perform the first communication based on at least one first RF path. The electronic device 101 may perform the first communication using the corresponding RF path based on, e.g., one frequency. Alternatively, the electronic device 101 may perform the first communication using corresponding RF paths (or a plurality of RF resources) based on a plurality of frequencies. For example, the electronic device 101 may perform carrier aggregation (CA) based on the first SIM 331, and in this case, based on a plurality of frequencies, may perform the first communication using a plurality of RF paths (or a plurality of RF resources). For example, the electronic device 101 may perform dual connectivity (DC) based on the first SIM 331, and in this case, based on a plurality of frequencies, may perform the first communication using a plurality of RF paths (or a plurality of RF resources).

In operation 505, the electronic device 101 may identify at least one second RF path that may be simultaneously available with the first RF path among the plurality of RF paths. The electronic device 101 may identify at least one second RF path, which may be simultaneously available with the first RF path, based on information regarding whether simultaneous use is possible, e.g., as shown in Table 1.

In operation 507, the electronic device 101 may perform second communication associated with the second SIM based on at least some of at least one second RF path. The electronic device 101 may identify a frequency (or frequency band) corresponding to at least some of at least one second RF path. For example, the electronic device 101 may identify a frequency (or a frequency band) corresponding to at least some of at least one second RF path based on the information regarding the RF path for each frequency as shown in Table 2. The electronic device 101 may perform the second communication based on the identified frequency. For example, the electronic device 101 may perform the second communication using the corresponding RF path based on one frequency. Alternatively, the electronic device 101 may perform the second communication using corresponding RF paths (or a plurality of RF resources) based on a plurality of frequencies. For example, the electronic device 101 may perform CA based on the second SIM 341, and in this case, based on a plurality of frequencies, may perform the second communication using a plurality of RF paths (or a plurality of RF resources). For example, the electronic device 101 may perform DC based on the second SIM 321, and in this case, based on a plurality of frequencies, may perform the second communication using a plurality of RF paths (or a plurality of RF resources).

According to another embodiment of the disclosure, rather than using the information regarding whether RF paths may be simultaneously available as shown in Table 1 and the information regarding RF paths used for each frequency as shown in Table 2, the electronic device 101 may identify the frequency corresponding to the second SIM 341 based on information regarding whether simultaneous use is possible for each frequency (or frequency band) as shown in Table 3.

TABLE 3

|  | first frequency | second frequency | third frequency | fourth frequency |
| --- | --- | --- | --- | --- |
| first frequency | N/A | Simultaneous use possible | Simultaneous use possible | Simultaneous use impossible |
| second frequency | Simultaneous use possible | N/A | Simultaneous use impossible | Simultaneous use possible |

TABLE 3-continued

|  | first frequency | second frequency | third frequency | fourth frequency |
|---|---|---|---|---|
| third frequency | Simultaneous use possible | Simultaneous use impossible | N/A | Simultaneous use possible |
| fourth frequency | Simultaneous use impossible | Simultaneous use possible | Simultaneous use possible | N/A |

For example, it is assumed that the electronic device 101 performs the first communication associated with the first SIM 331 using the first frequency. The electronic device 101 may identify the third frequency and the second frequency as frequencies that may be simultaneously available with the first frequency based on, e.g., information regarding whether simultaneous use is possible for each frequency as shown in Table 3. The electronic device 101 may perform the second communication associated with the second SIM 341 using at least one of the third frequency or the second frequency. Accordingly, the first SIM 331 and the second SIM 341 may operate in the DSDA mode. For example, in a cell reselection operation for the second SIM 341, the electronic device 101 may perform a search on the second frequency prior to other frequency or may adjust the priority for the cell supporting the second frequency. For example, if the DSDA mode operation is possible, the electronic device 101 may keep camping on the cell corresponding to the second SIM 341. The electronic device 101 may be able to operate in the DSDA mode of the first SIM 331 and the second SIM 341 without identifying an RF path.

According to various embodiments of the disclosure, the electronic device 101 may determine whether the SIM set for calling is capable of simultaneous use with the SIM set for data communication and select an RF path for the SIM set for calling. In this case, since the speed of data communication is sensitively varied depending on the electric field, an RF path of the SIM set for calling may be selected so that a more stable speed may be guaranteed. However, this is merely an example, and the electronic device 101 may adjust the RF path of the SIM set for data communication.

Whenever the frequency band of the serving cell for the SIM set for data communication is changed, the electronic device 101 may determine whether simultaneous use is possible for the SIM set for calling. If simultaneous use is impossible, the electronic device 101 may change the RF path for the SIM set for calling to an RF path capable for simultaneous use and, based thereupon, perform cell selection.

Figure 6:
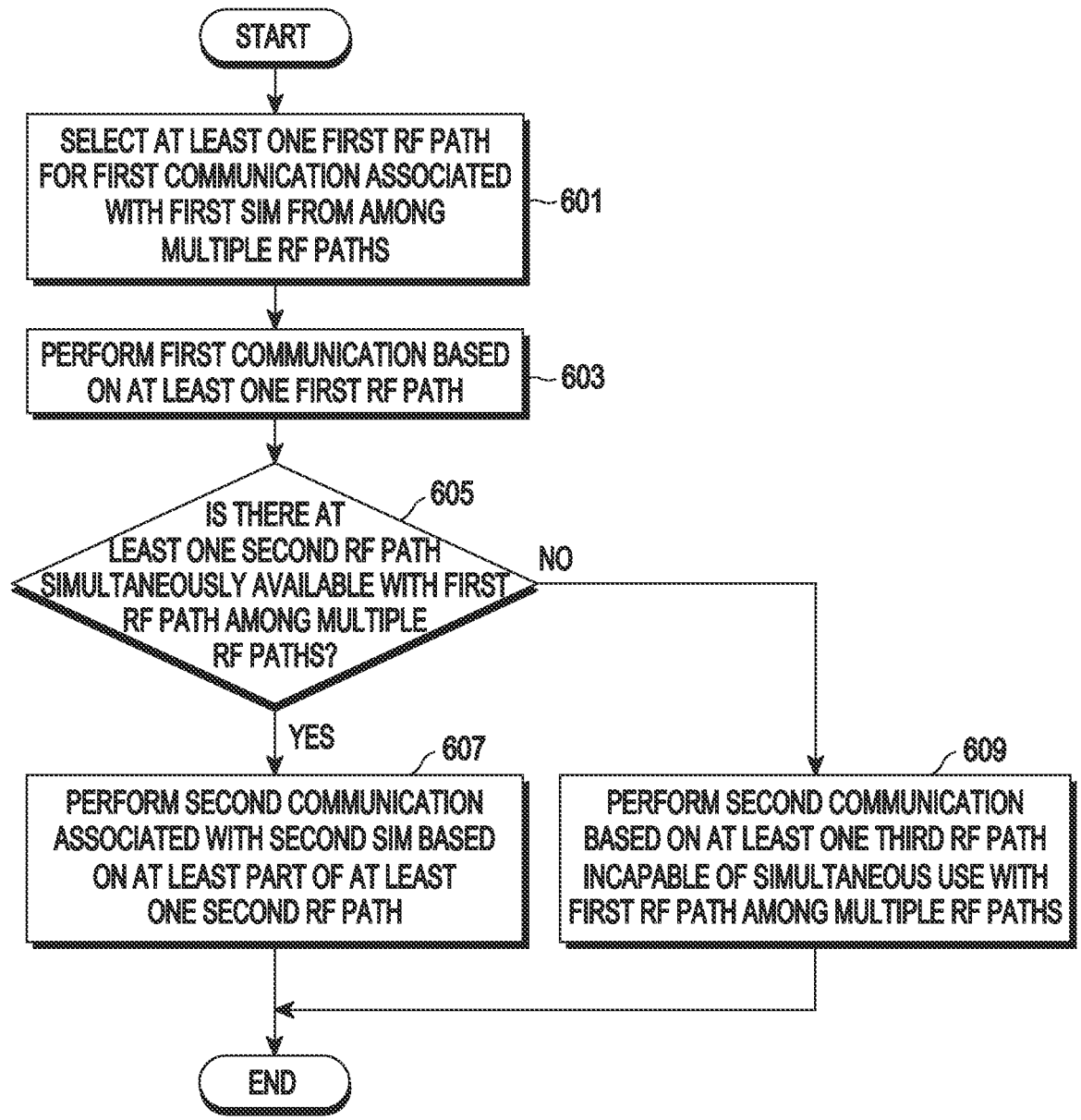
FIG. 6 is a flowchart illustrating an operation method of an electronic device according to an embodiment of the disclosure.

FIG. 6 is a flowchart illustrating an operation method of an electronic device according to an embodiment of the disclosure.

Referring to FIG. 6, an electronic device 101 (e.g., at least one of the processor 120, the first communication processor 212, the second communication processor 214, or the integrated communication processor 260) may select at least one first RF path for first communication associated with the first SIM 331 from among a plurality of RF paths in operation 601. As described above, in a cell selection or cell reselection operation, the electronic device 101 may identify the first frequency as a frequency for the first communication of the first SIM 331. The electronic device 101 may select the first RF path corresponding to the first frequency. In operation 603, the electronic device 101 may perform the first communication based on at least one first RF path.

In operation 605, the electronic device 101 may determine whether there is at least one second RF path that may be simultaneously available with the first RF path among the plurality of RF paths. For example, the electronic device 101 may determine whether at least one second RF path exists based on the information regarding whether simultaneous use is possible for each RF path as shown in Table 1. If there is at least one second RF path that may be simultaneously available with the first RF path (Yes in 605), then in operation 607, the electronic device 101 may perform the second communication associated with the second SIM 341 based on at least some of the at least one second RF path. Accordingly, the first SIM 331 and the second SIM 341 may operate in the DSDA mode.

If at least one second RF path that may be simultaneously available with the first RF path does not exist (No in 605), the electronic device 101 may perform the second communication based on at least one third RF path, which may not be simultaneously available with the first RF path among the plurality of RF paths, in operation 609. Accordingly, the first SIM 331 and the second SIM 341 may operate in the DSDS mode. For example, while the first SIM 331 uses a plurality of RF paths (e.g., the first RF path and the second RF path in Table 1) based on CA or DC, it may be identified that there is no simultaneously available RF path. As another example, at least one second RF path that may be simultaneously available with the first RF path may be identified. However, a cell supporting the frequency associated with the second RF path may not be discovered. In this case, as in operation 609, the electronic device 101 may perform second communication based on at least one third RF path that may not be simultaneously available with the first RF path.

If, according to operation 609, the first SIM 331 and the second SIM 341 operate in the DSDS mode, the electronic device 101 may periodically or aperiodically perform operation 605 to determine whether the DSDA operation is possible. For example, although a second RF path that may be simultaneously available with the first RF path exists, a cell supporting frequency corresponding to the second RF path is not discovered but, as the electronic device 101 moves, the corresponding cell may be discovered. In this case, the electronic device 101 may perform a cell reselection or handover procedure supported by the frequency associated with the second RF path that may be simultaneously available with the first RF path.

Figure 7:
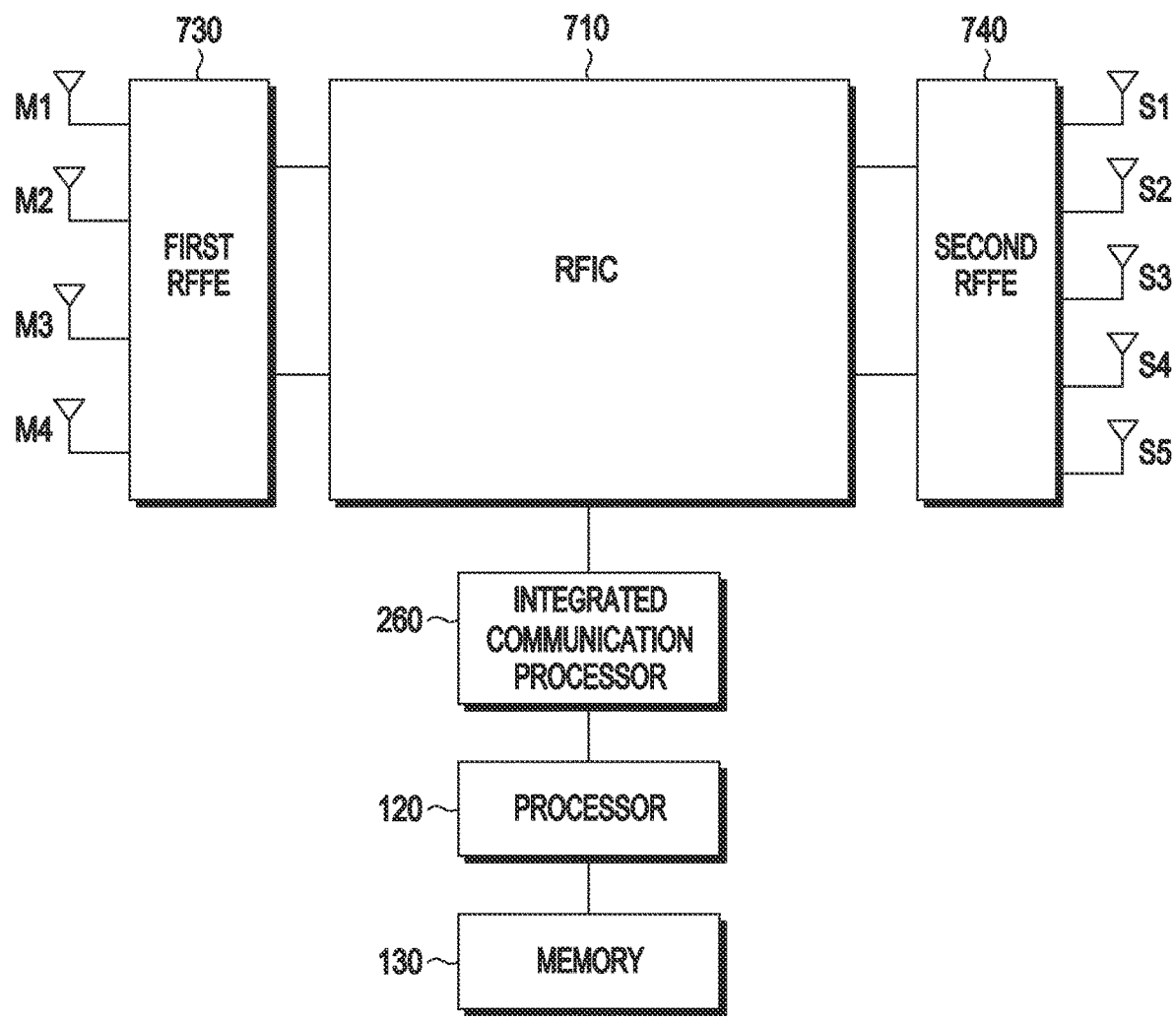
FIG. 7 is a block diagram illustrating an electronic device according to an embodiment of the disclosure.

FIG. 7 is a block diagram illustrating an electronic device according to an embodiment of the disclosure.

Referring to FIG. 7, the electronic device 101 may include a processor 120, a memory 130, an integrated communication processor 260, an RFIC 710, a first RFFE 730, a second RFFE 740, and antennas M1, M2, M3, M4, S1, S2, S3, S4, and S5. For example, the RFIC 710 may perform substantially similar operations to the RFIC 410 in FIG. 4A, and the RFFEs 730 and 740 may perform operations substantially similar to those of the RFFEs 431 and 432 of FIG. 4A. The electronic device 101 may include main antennas M1, M2, M3, and M4 and slave antennas S1, S2, S3, S4, and S5. The main antennas M1, M2, M3, and M4 may be primary RX antennas, and the slave antennas S1, S2, S3, S4, and S5 may be diversity RX antennas. Frequencies supported by the electronic device 101 may be divided into a low band, a mid band, a high band, and an ultra-high band, but criteria for dividing the bands are not limited thereto. For example, RF resources (e.g., antennas) of the electronic device 101 may correspond to frequencies as shown in Table 4.

TABLE 4

| frequency band | RF resources (e.g., antenna) |
|---|---|
| Low band (e.g., 5, 8, 20) | M1, S1 |
| Mid band (1, 2, 3, 4) | M1, S1, M2, S2 |
| high band (7, 38, 39, 40, 41) | M2, S2, M3, S4 |
| Ultra-high band (78, 79) | M3, M4, S3, S5 |

Referring to Table 4, communication signals of bands 5, 8, and 20 included in the low band may be transmitted/received through the M1 antenna and the S1 antenna. For example, communication signals of bands 1, 2, 3, and 4 included in the mid band may be transmitted/received through the M1 antenna, the M2 antenna, the S1 antenna, and the S2 antenna. Communication signals of bands 7, 38, 39, 40, and 41 included in the high band may be transmitted/received through the M2 antenna, the M3 antenna, the S2 antenna, and the S4 antenna. Communication signals of bands 78 and 79 included in the ultra-high band may be transmitted/received through the M3 antenna, the M4 antenna, the S3 antenna, and the S5 antenna.

The M1 antenna and the S1 antenna used in the low band and the M1 antenna and the S1 antenna used in the mid band may be the same antennas but may have different RF paths. For example, at least one hardware combination associated with converting the baseband signal output from the integrated communication processor 260 in the low band into the communication signal output through the M1 antenna and the S1 antenna may be the same as or different from at least one hardware combination associated with converting the baseband signal output from the integrated communication processor 260 in the mid band into the communication signal output through the M1 antenna and the S1 antenna. One or more RF paths may be configured for one antenna. In a case where one RF path is configured for each antenna, if the M1 antenna is used in the low band, the M1 antenna may not be used in the mid band.

According to various embodiments of the disclosure, two RF resources may need to be used for use of the low band, the mid band, and the high band, and four RF resources may need to be used for use of the ultra-high band. For example, according to Table 4, only the M1 antenna and the S1 antenna may be used in the low band. For example, according to Table 4, in the mid band, the M1 antenna or the S1 antenna may be used, or the M2 antenna or the S2 antenna may be used. For example, according to Table 4, in the high band, the M2 antenna or the S2 antenna may be used, or the M3 antenna or the S4 antenna may be used. For example, according to Table 4, in the ultra-high band, the M3 antenna, the M4 antenna, the S3 antenna, and the S5 may be used. For the mid band and high band, there are two methods for selecting RF resources, but not all possible combinations may be supported. For example, combinations that are identified as causing performance degradation depending on the design may not be supported.

According to various embodiments of the disclosure, if the electronic device 101 uses the ENDC for the first SIM 331, the B7 band of LTE and the N78 band of NR may be used. The electronic device 101 may use the M3 antenna, the M4 antenna, the S3 antenna, and the S5 antenna for the N78 band and may use the M2 antenna and the S2 antenna for the B7 band. In this case, the M1 antenna and the S1 antenna may not be used by the first SIM 331. When the electronic device 101 uses the M1 antenna and the S1 antenna for the second SIM 341, the first SIM 331 and the second SIM 341 may operate in the DSDA mode. The electronic device 101 may perform cell selection and/or cell reselection on the low band (e.g., bands 5, 8, and 20) or mid band (bands 1, 2, 3, and 4) corresponding to the M1 antenna and the S1 antenna prior to other frequency. A detailed process of cell selection and/or cell reselection is described below.

If specific antennas are selected, the electronic device 101 may control the on/off state of at least one switch (not shown) so that an RF signal is transferred to the selected antennas and/or an RF signal is transferred from the selected antennas to the RFFE. Further, the electronic device 101 may control at least one of the RFIC 710, the first RFFE 730, or the second RFFE so that the RF signal is transferred to the selected antennas and/or the RF signal is transferred from the selected antennas to the RFFE.

According to various embodiments of the disclosure, the electronic device 101 may store information for band combinations that may be simultaneously available as shown in Table 5.

TABLE 5

| SIM1 | | SIM2 |
|---|---|---|
| | LTE Band | |
| MID | 1 | LOW(B5/B8/B20) |
| | | HIGH(B7/B38/B39/B40/B41) |
| | | 3 |
| | 2 | LOW(B5/B8/B20) |
| | | HIGH(B7/B38/B39/B40/B41) |
| | | 4 |
| | 3 | LOW(B5/B8/B20) |
| | | HIGH(B7/B38/B39/B40/B41) |
| | | 1 |
| | 4 | LOW(B5/B8/B20) |
| | | HIGH(B7/B38/B39/B40/B41) |
| | | 2 |
| LOW | 5, 8, 20 | MID(B1/B2/B3/B4) |
| | | HIGH(B7/B38/B39/B40/B41) |
| HIGH | 7 | LOW(B5/B8/B20) |
| | | MID(B1/B2/B3/B4) |
| | | 40 |
| | 38 | LOW(B5/B8/B20) |
| | | MID(B1/B2/B3/B4) |
| | | 40 |
| | 39 | LOW(B5/B8/B20) |
| | | MID(B1/B2/B3/B4) |
| | 40 | LOW(B5/B8/B20) |
| | | MID(B1/B2/B3/B4) |
| | | 7 |
| | | 38 |
| | | 41 |
| | 41 | LOW(B5/B8/B20) |
| | | MID(B1/B2/B3/B4) |
| | | 40 |

For example, the mid band of the first SIM 331 may be simultaneously available with the low band (e.g., bands 5, 8, and 20) and high band (7, 38, 39, 40, and 41) of the second SIM 341. Band 1 of the mid band of the first SIM 331 may be simultaneously available with band 3 of the mid band of the second SIM 341. Band 2 of the mid-band of the first SIM 331 may be simultaneously available with band 4 of the mid band of the second SIM 341. Band 3 of the mid band of the first SIM 331 may be simultaneously available with band 1 of the mid band of the second SIM 341. Band 4 of the mid band of the first SIM 331 may be simultaneously available with band 2 of the mid band of the second SIM 341. For example, the low band (e.g., bands 5, 8, and 20) of the first SIM 331 may be simultaneously available with the mid band (e.g., bands 1, 2, 3, and 4) and high band (e.g., bands 7, 38, 39, 40, and 41) of the second SIM 341. For example, the high band of the first SIM 331 may be simultaneously available with the low band (e.g., bands 5, 8, and 20) and the mid band (bands 1, 2, 3, and 4) of the second SIM 341. Band 7 of the high band of the first SIM 331 may be simultaneously available with band 40 of the high band of the second SIM 341, and band 38 of the high band of the first SIM 331 may be used with the band 40 of the high band of the second SIM 341. Band 40 of the high band of the first SIM 331 may be simultaneously available with bands 7, 38, and 41 of the high band of the second SIM 341, and band 41 of the high band of the first SIM 331 may be simultaneously available with band 40 of the high band of the second SIM 341.

When the electronic device 101 stores information regarding whether simultaneous use is possible for each band (or for each frequency) as shown in Table 5, the electronic device 101 may identify the frequency band (or frequency) corresponding to the second SIM 341 that may operate in the DSDA mode even without using whether simultaneous use is possible for RF paths (or RF resources). The electronic device 101 may perform cell selection and/or cell reselection based on the identified frequency band (or frequency). Information, such as in Table 4 or Table 5, may be managed by, e.g., the integrated communication processor 260. The electronic device 101 may use the information as shown in Table 4 or 5 in cell selection and/or cell reselection at the time of cell selection and/or cell reselection for, e.g., the second SIM 341.

Figure 8A:
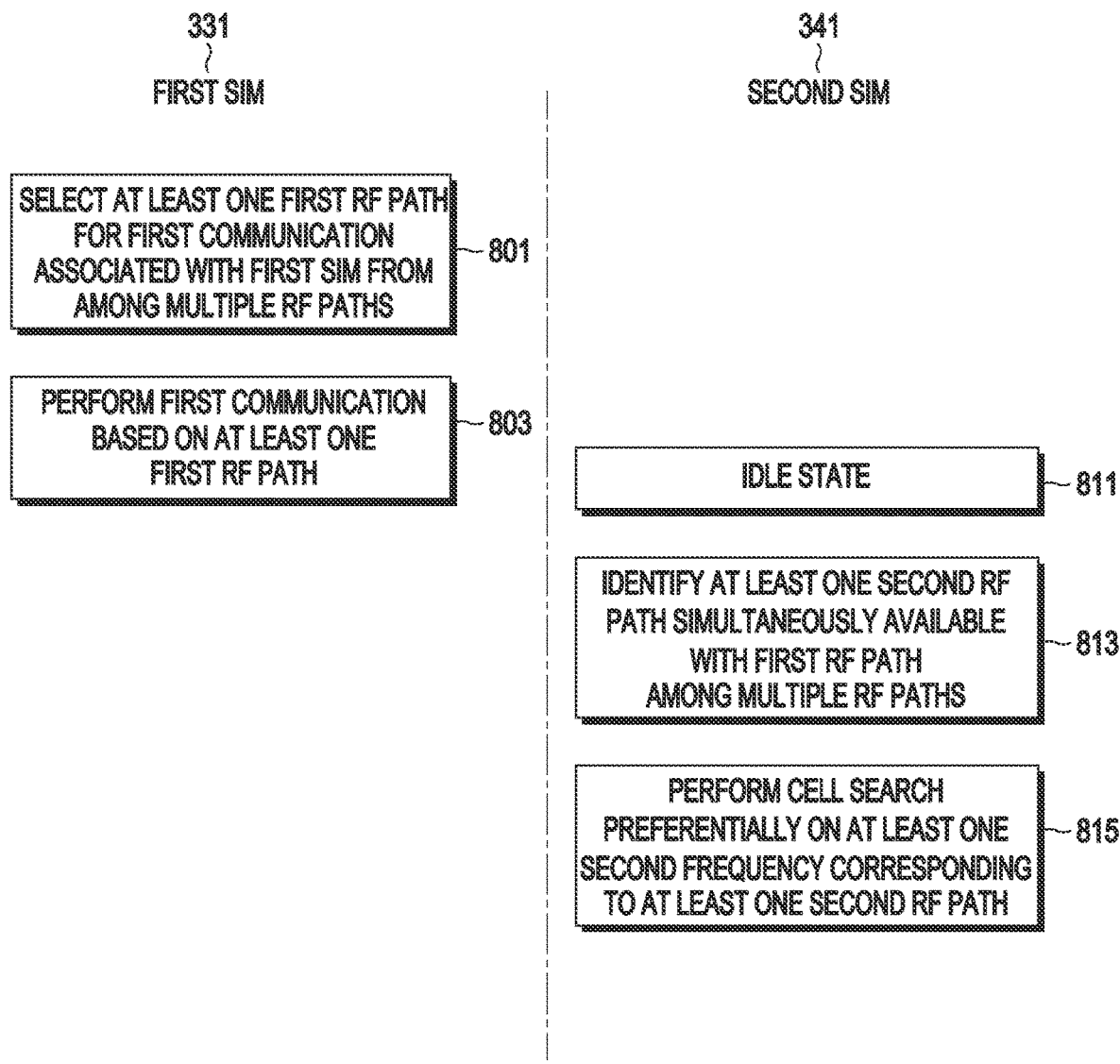
FIG. 8A is a flowchart illustrating an operation method of an electronic device according to an embodiment of the disclosure.

FIG. 8A is a flowchart illustrating an operation method of an electronic device according to an embodiment of the disclosure. The embodiment of FIG. 8A is described with reference to FIG. 8B.

Figure 8B:
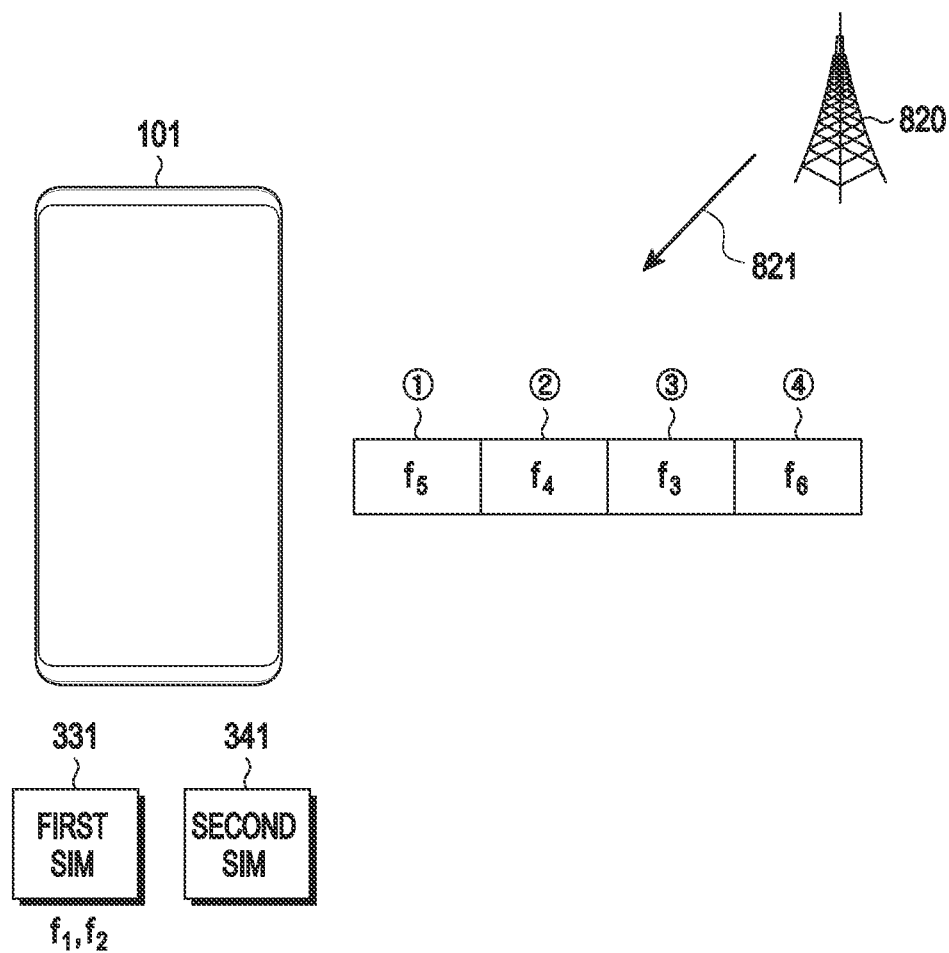
FIG. 8B is a view illustrating a cell search by an electronic device according to an embodiment of the disclosure.

FIG. 8B is a view illustrating a cell search by an electronic device according to an embodiment of the disclosure.

Referring to FIG. 8A, an electronic device 101 (e.g., at least one of the processor 120, the first communication processor 212, the second communication processor 214, or the integrated communication processor 260) may select at least one first RF path for first communication associated with the first SIM 331 from among a plurality of RF paths in operation 801. As described above, in a cell selection or cell reselection operation, the electronic device 101 may identify the first frequency as a frequency for the first communication of the first SIM 331. The electronic device 101 may select the first RF path corresponding to the first frequency. In operation 803, the electronic device 101 may perform the first communication based on at least one first RF path. The electronic device 101 may be in one state among a connected state, an idle state, and an inactive state in association with the first SIM 331.

In operation 811, the electronic device 101 may be in the idle state in association with the second SIM 341. For example, while the first SIM 331 performs a network search and network registration, the second SIM 341 may be in a state prior to camping on any cell. With respect to the EUTRA RAT, the electronic device 101 may perform cell selection in the idle state. With respect to the NR RAT, the electronic device 101 may perform cell selection in the idle state or the inactive state. The electronic device 101 may enter the idle state from another state (e.g., the connected state or the inactive state). Alternatively, the electronic device 101 may camp on a specific cell after being turned on and be in the idle state in which system information for the corresponding cell may be read. The electronic device 101 may enter the inactive state from the connected state. In operation 813, the electronic device 101 may identify at least one second path that may be simultaneously available with the first path among the plurality of RF paths. In operation 815, the electronic device 101 may perform a cell search on at least one second frequency corresponding to the at least one second path prior to other frequency.

Referring to FIG. 8B, the electronic device 101 may perform first communication on the first SIM 331 using frequency f1 and frequency f2. The electronic device 101 may use at least one first RF path to use the f1 frequency and the f2 frequency. The electronic device 101 may determine at least one second RF path that may be simultaneously available with the at least one first RF path. The electronic device 101 may perform a search on the frequency corresponding to at least one second RF path prior to other frequency. For example, the electronic device 101 may identify frequency f5 and frequency f4 as frequencies corresponding to the second RF path. In this case, the electronic device 101 may perform a search on the f5 frequency and the f4 frequency prior to other frequency other frequencies (e.g., the f3 frequency and the f6 frequency). The electronic device 101 may identify a signal 821 (e.g., a synchronization signal or a reference signal) from the network 820 (e.g., a base station) according to a result of the search result and may camp on the corresponding cell.

According to various embodiments of the disclosure, the electronic device 101 may scan all frequencies (or RF channels) supported by the electronic device 101 if the electronic device 101 does not store existing information regarding RF channels. In this case, the electronic device 101 may perform a scan from frequencies, at which the electronic device 101 may operate in DSDA, among all supported frequencies. Although the electronic device 101 searches for a cell at the frequency corresponding to the second RF path, the electronic device 101 may select the corresponding cell if the cell selection criterion S is met. For example, when the cell selection criteria that Srxlev is greater than 0 and Squal is greater than 0 are met, the electronic device 101 may perform cell selection. Here, Srxlev may be $Q_{rxlevmeas}-(Q_{rxlevmin}+Q_{rxlevminoffset})-P_{compensation}-Qoffset_{temp}$, and Squal may be $Q_{qualmeas}-(Q_{qualmin}+Q_{qualminoffset})-Qoffset_{temp}$. A description of each parameter is shown in Table 6.

TABLE 6

| | |
|---|---|
| Srxlev | Cell selection RX level value (dB) |
| Squal | Cell selection quality value (dB) |
| $Qoffset_{temp}$ | Offset temporarily applied to a cell as specified in TS(technical specification) 38.331 (dB) |
| Qrxlevmeas | Measured cell RX level value (RSRP) |
| Qqualmeas | Measured cell quality value (RSRQ) |
| Qrxlevmin | Minimum required RX level in the cell (dBm). If the UE supports SUL frequency for this cell, Qrxlevmin is obtained from RxLevMinSUL, if present, in SIB1, SIB2 and SIB4, additionally, if QrxlevminoffsetcellSUL is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1 Levin, SIB2 and SIB4, additionally, if Qrxlevminoffsetcell is present in SIB3 and SIB4 for the concerned cell, this cell specific offset is added to the corresponding Qrxlevmin to achieve the required minimum RX level in the concerned cell. |
| Qqualmin | Minimum required quality level in the cell (dB). Additionally, if Qqualminoffsetcell is signalled for the concerned cell, this cell specific offset is added to achieve the required minimum quality level in the concerned cell. |

TABLE 6-continued

| | |
|---|---|
| Qrxlevminoffset | Offset to the signalled Qrxlevmin taken into account in the Srxlev evaluation as a result of a periodic search for a higher priority PLMN while camped normally in a VPLMN 3GPP TS 23.122 |
| Qqualminoffset | Offset to the signalled Qqualmin taken into account in the Squal evaluation as a result of a periodic search for a higher priority PLMN while camped normally in a VPLMN 3GPP TS 23.122 |
| Pcompensation | If the UE supports the additionalPmax in the NS-PmaxList, if present, in SIB1, SIB2 and SIB4: max(PEMAX1 − PPowerClass, 0) − (min(PEMAX2, PPowerClass) − min(PEMAX1, PPowerClass)) (dB); else: max(PEMAX1 − PPowerClass, 0) (dB) |
| PEMAX1, PEMAX2 | Maximum TX power level of a UE may use when transmitting on the uplink in the cell (dBm) defined as PEMAX in TS 38.101 [15]. PEMAX1 and PEMAX2 are obtained from the p-Max and NS-PmaxList respectively in SIB1, SIB2 and SIB4 as specified in TS 38.331 |
| PPowerClass | Maximum RF output power of the UE (dBm) according to the UE power class as defined in TS 38.101 |

Table 6 is based on 3GPP TS 38.331, and it will be understood by those skilled in the art that, for EUTRA, it may be replaced with definitions set forth in 3GPP TS 36.331 for EUTRA. When the signal 821 from the base station corresponding to the second SIM 341 capable of DSDA mode operation meets the cell selection criterion, the electronic device 101 may select a corresponding cell.

In one example, as in the embodiment of FIG. 7, the electronic device 101 may support the low band (e.g., 5, 8, and 20), the mid band (1, 2, 3, and 4), the high band (7, 38, 39, 40, and 41), and the ultra-high bands (78 and 79). The electronic device 101 may use RF resources for each band as shown in Table 4. The electronic device 101 may allocate an n78 band and a b7 band to the first SIM 331 to perform first communication. The electronic device 101 may use the RF resources of M3, M4, S3, and S5 corresponding to the n78 band based on the information in Table 4 and may use the RF resources of M2 and S2 corresponding to the b7 band. The RF resources available simultaneously with the RF resource of the first SIM 331 may be M1, S1, and S4. Based on the information in Table 5, frequency bands corresponding to simultaneously available RF resources may be identified as 5, 8, and 20 of the low band and 1, 2, 3, and 4 of the mid band, and it may be identified that in the high band or ultra-high band, there is no frequency band corresponding to simultaneously available RF resource.

If a preferential search is not applied, the electronic device 101 may perform a cell search according to the priority as shown in Table 7 (e.g., priority set inside the electronic device 101).

TABLE 7

| priority | 12 | 11 | 10 | 9 | 8 | 7 | 6 | 5 | 4 | 3 | 2 | 1 |
|---|---|---|---|---|---|---|---|---|---|---|---|---|
| band | 7 | 5 | 38 | 8 | 39 | 20 | 1 | 40 | 41 | 2 | 3 | 4 |

The priority in Table 7 may be set inside the electronic device 101 and may have a value ranging from 1 to 12. The larger the number, the higher the priority may be. The electronic device 101 may perform a cell search according to the priority as shown in Table 7, e.g., based on requirements of the network operator or information mainly used in the area or country.

If a preferential search according to various embodiments is applied, the electronic device 101 may perform a cell search according to the priority as shown in Table 8 (e.g., priority set inside the electronic device 101).

TABLE 8

| priority | 12 | 11 | 10 | 9 | 8 | 7 | 6 | 5 | 4 | 3 | 2 | 1 |
|---|---|---|---|---|---|---|---|---|---|---|---|---|
| band | 5 | 8 | 20 | 1 | 2 | 3 | 4 | 7 | 38 | 39 | 40 | 41 |

As described above, bands corresponding to simultaneously available RF resources may be identified as 5, 8, and 20 of the low band and 1, 2, 3, and 4 of the mid band. The electronic device 101 may set a higher priority for bands 5, 8, 20, 1, 2, 3, and 4 to perform a cell search prior to other frequency.

If a cell meeting the cell selection criterion is detected in bands 5, 8, 20, 1, 2, 3, and 4, the electronic device 101 may select the corresponding cell and may operate in the DSDA mode later. If a cell meeting the cell selection criterion is not detected (e.g., weak electric field or barred cell detected) in bands 5, 8, 20, 1, 2, 3, and 4, and a cell meeting the cell selection criterion is detected in the remaining bands (bands 7, 38, 39, 40, and 41), the corresponding cell may be selected, and it may operate in the DSDS mode later. Since a band capable of operating in the DSDA mode is searched prior to other frequencies, the possibility that the electronic device 101 operates in the DSDA mode may be higher than that of the related art.

In a case where the electronic device 101 camps on a suitable cell or acceptable cell meeting the cell selection criterion S, the electronic device 101 may camp on the cell supporting the above-described DSDA mode operation-capable band and, even when camping on any cell, the electronic device 101 may camp on the cell supporting the DSDA mode operation-capable frequency band.

In another example, the electronic device 101 may allocate an n78 band and a b5 band to the first SIM 331 to perform first communication. The electronic device 101 may use the RF resources of M3, M4, S3, and S5 corresponding to the n78 band based on the information in Table 4 and may use the RF resources of M1 and S1 corresponding to the b5 band. The RF resources available simultaneously with the RF resource of the SIM 331 may be M2, S2, and S4. Frequency bands corresponding to simultaneously available RF resources may be identified as 7, 38, 39, 40, and 41 of the high band, and it may be identified that in the low band or mid band, there is no band corresponding to simultaneously available RF resource. If a preferential search is not applied, the electronic device 101 may perform a cell search according to the priority as shown in Table 7 (e.g., priority set inside the electronic device 101).

If a preferential search is applied, the electronic device 101 may perform a cell search according to the priority as shown in Table 9 (e.g., priority set inside the electronic device 101).

TABLE 9

| priority | 12 | 11 | 10 | 9 | 8 | 7 | 6 | 5 | 4 | 3 | 2 | 1 |
|---|---|---|---|---|---|---|---|---|---|---|---|---|
| band | 7 | 38 | 39 | 40 | 41 | 5 | 8 | 20 | 1 | 2 | 3 | 4 |

As described above, frequency bands corresponding to simultaneously available RF resources may be identified as bands 7, 38, 39, 40, and 41. The electronic device 101 may set a Higher priority for bands 7, 38, 39, 40, and 41 to perform a cell search prior to other frequency.

If a cell meeting the cell selection criterion is detected in bands 7, 38, 39, 40, and 41, the electronic device 101 may select the corresponding cell and may operate in the DSDA mode later. If a cell meeting the cell selection criterion is not detected in bands 7, 38, 39, 40, and 41, and a cell meeting the cell selection criterion is detected in the remaining frequency bands (bands 5, 8, 20, 1, 2, 3, and 4), the corresponding cell may be selected, and it may operate in the DSDS mode later. Since a band capable of operating in the DSDA mode is searched prior to other frequency, the possibility that the electronic device 101 operates in the DSDA mode may increase as compared to the related art.

Figure 9A:
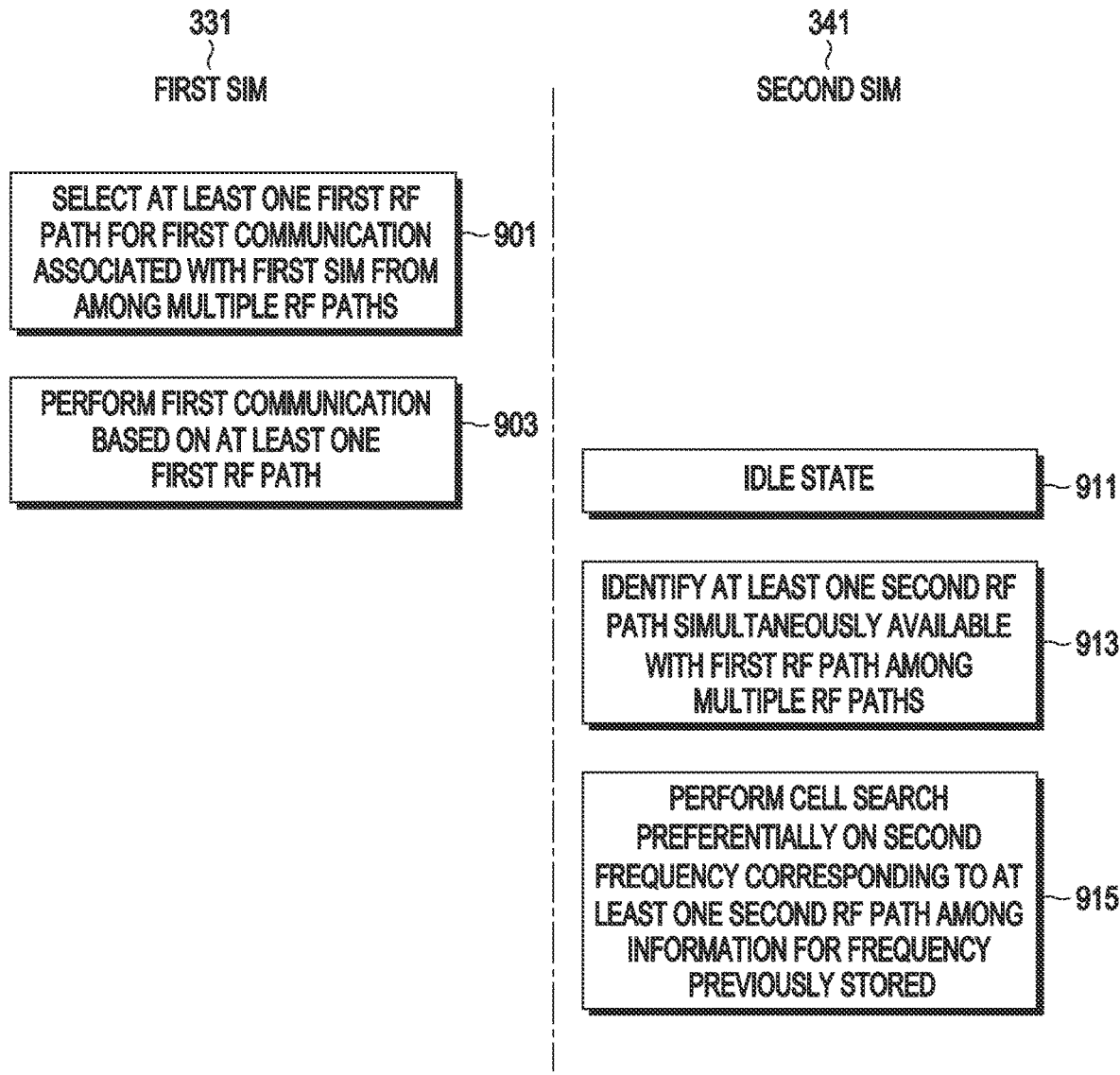
FIG. 9A is a flowchart illustrating an operation method of an electronic device according to an embodiment of the disclosure.

FIG. 9A is a flowchart illustrating an operation method of an electronic device according to an embodiment of the disclosure. The embodiment of FIG. 9A is described with reference to FIG. 9B.

Figure 9B:
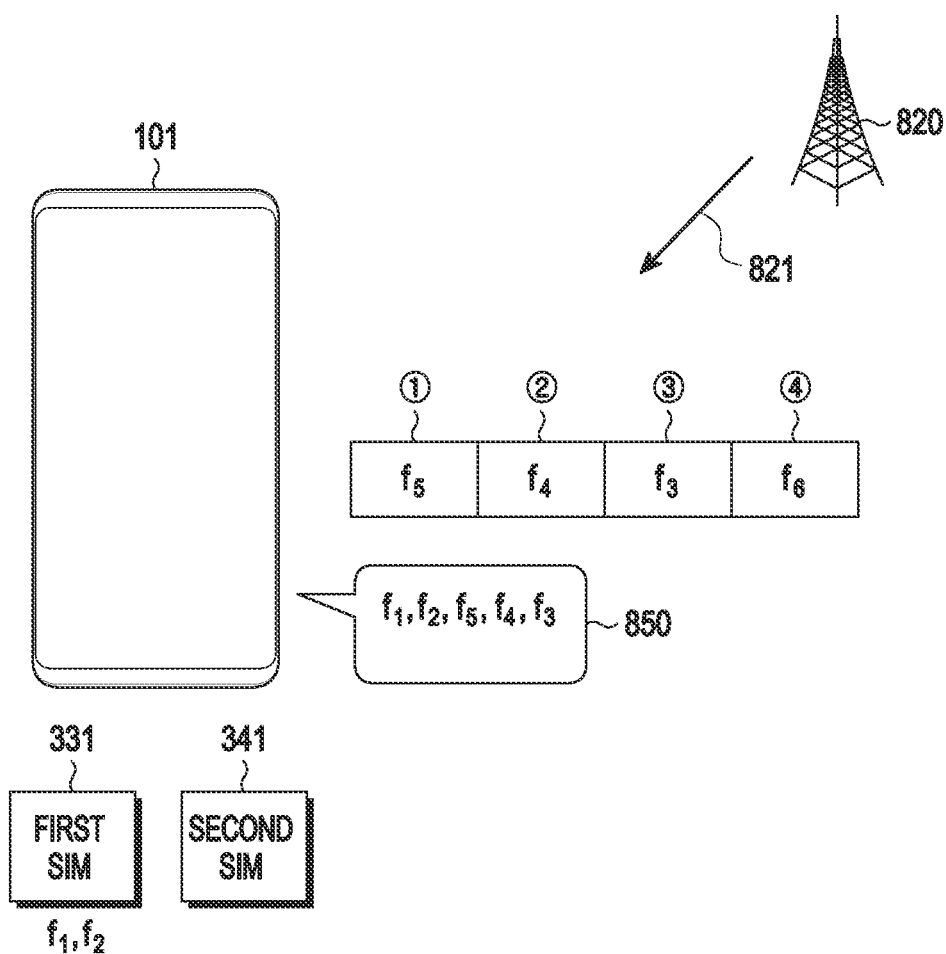
FIG. 9B is a view illustrating a cell search by an electronic device according to an embodiment of the disclosure.

FIG. 9B is a view illustrating a cell search by an electronic device according to an embodiment of the disclosure.

Referring to FIG. 9A, an electronic device 101 (e.g., at least one of the processor 120, the first communication processor 212, the second communication processor 214, or the integrated communication processor 260) may select at least one first RF path for first communication associated with the first SIM 331 from among a plurality of RF paths in operation 901. As described above, in a cell selection or cell reselection operation, the electronic device 101 may identify the first frequency as a frequency for the first communication of the first SIM 331. The electronic device 101 may select the first RF path corresponding to the first frequency. In operation 903, the electronic device 101 may perform the first communication based on at least one first RF path. The electronic device 101 may be in one state among a connected state, an idle state, and an inactive state in association with the first SIM 331.

In operation 911, the electronic device 101 may be in the idle state in association with the second SIM 341. In operation 913, the electronic device 101 may identify at least one second path that may be simultaneously available with the first path among the plurality of RF paths. In operation 915, the electronic device 101 may perform a cell search on at least one second frequency corresponding to the at least one second path, of pre-stored information for frequencies prior to other frequency.

Referring to FIG. 9B, the electronic device 101 may perform first communication on the first SIM 331 using frequency f1 and frequency f2. The electronic device 101 may use at least one first RF path to use the f1 frequency and the f2 frequency. The electronic device 101 may determine at least one second RF path that may be simultaneously available with the at least one first RF path. The electronic device 101 may perform a search on the frequency corresponding to at least one second RF path among the frequencies included in the pre-stored information 850 prior to other frequency. For example, the electronic device 101 may identify frequency f5 and frequency f4 as frequencies corresponding to the second RF path. In this case, the electronic device 101 may perform a search on the f5 frequency and the f4 frequency prior to other frequencies (e.g., the f3 frequency and the f6 frequency). The electronic device 101 may identify a signal 821 (e.g., a synchronization signal or a reference signal) from the network 820 (e.g., a base station) according to a result of the search result and may camp on the corresponding cell.

According to various embodiments of the disclosure, the electronic device 101 may use stored information for at least one RAT to accelerate a cell selection process. The information may include information for frequency, and optionally, may include information for previously received measurement control information elements or information for cell parameters from the previously detected cell. If detecting a suitable cell based on the stored information, the electronic device 101 may select the corresponding cell. If a suitable cell is not detected, the electronic device 101 may perform a cell selection process as shown in FIG. 8A for all supported RF channels (or frequencies).

Figure 10:
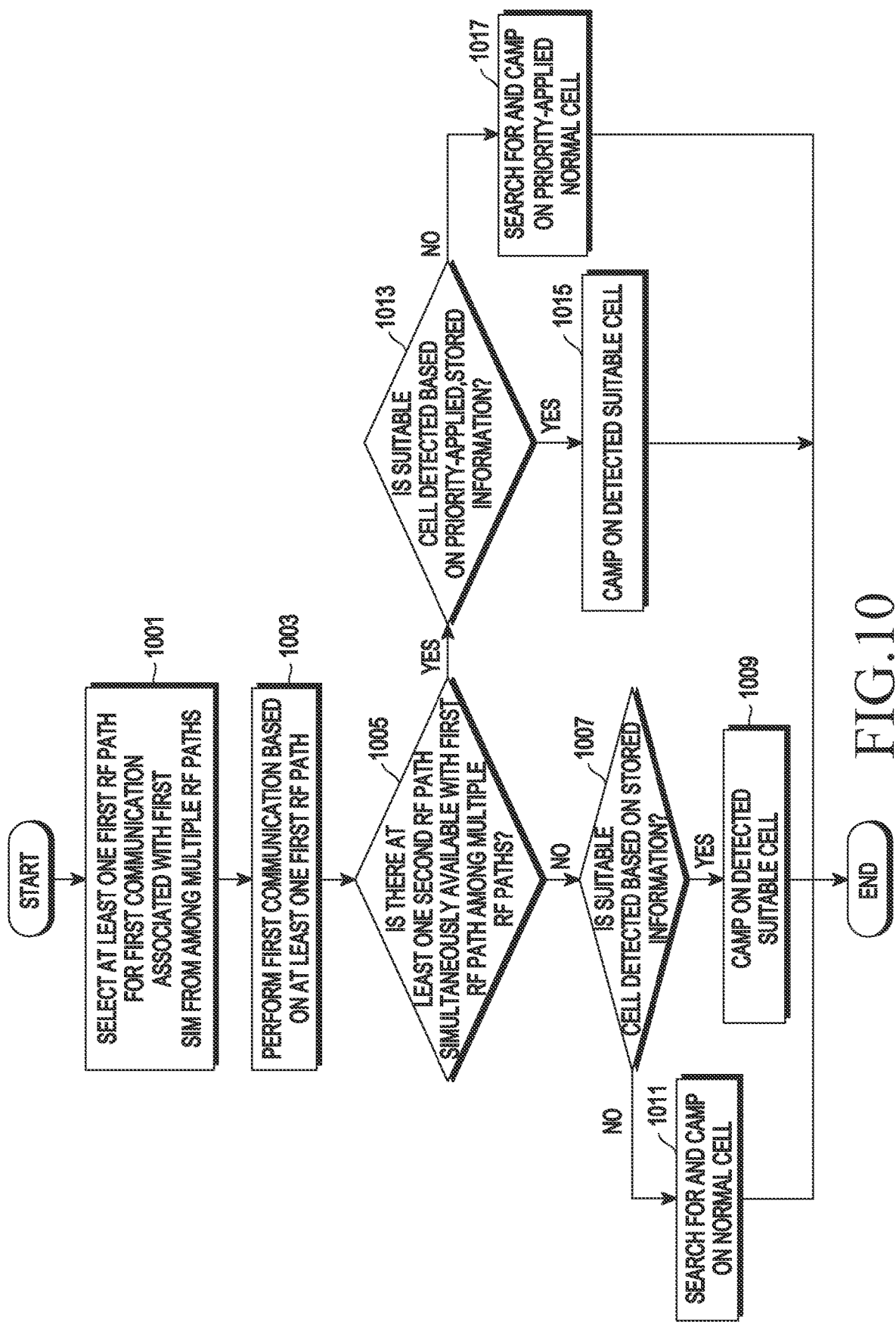
FIG. 10 is a flowchart illustrating an operation method of an electronic device according to an embodiment of the disclosure.

FIG. 10 is a flowchart illustrating an operation method of an electronic device according to an embodiment of the disclosure.

Referring to FIG. 10, an electronic device 101 (e.g., at least one of the processor 120, the first communication processor 212, the second communication processor 214, or the integrated communication processor 260) may select at least one first RF path for first communication associated with the first SIM 331 from among a plurality of RF paths in operation 1001. As described above, in a cell selection or cell reselection operation, the electronic device 101 may identify the first frequency as a frequency for the first communication of the first SIM 331. The electronic device 101 may select the first RF path corresponding to the first frequency. In operation 1003, the electronic device 101 may perform the first communication based on at least one first RF path. In operation 1005, the electronic device 101 may determine whether there is at least one second RF path that may be simultaneously available with the first RF path among the plurality of RF paths.

If at least one second RF path simultaneously available does not exist (No in operation 1005), the electronic device 101 may determine whether a suitable cell is detected based on stored information in operation 1007. The stored information may include information for frequency, and optionally, may include information for previously received measurement control information elements or information for cell parameters from the previously detected cell. If a suitable cell is detected (Yes in operation 1007) based on the stored information, the electronic device 101 may camp on the detected suitable cell in operation 1009. If a suitable cell is not detected based on the stored information (No in operation 1007), the electronic device 101 may perform a general cell search and camp-on procedure in operation 1011. For example, the electronic device 101 may perform a cell search on all supported RF channels and, based on the result of the search, perform camp-on. In operation 1005, if it is determined that at least one second RF path simultaneously available does not exist, the electronic device 101 may perform a cell selection procedure according to, e.g., 3GPP TS 38.304 or 3GPP TS 36.034.

If at least one second RF path simultaneously available exists (Yes in operation 1005), the electronic device 101 may determine whether a suitable cell is detected based on priority-applied, stored information in operation 1013. For example, as described with reference to FIGS. 9A and 9B, the electronic device 101 may perform a cell search on the frequency corresponding to the second RF path among frequencies of previously stored information prior to other frequency. If a suitable cell is detected (Yes in operation 1013), the electronic device 101 may camp on the detected suitable cell in operation 1015. If a suitable cell is not detected (No in operation 1013), the electronic device 101 may perform a priority-applied, general cell search and camp-on procedure in operation 1017. For example, as described with reference to FIGS. 8A and 8B, the electronic device 101 may perform a cell search on the frequency corresponding to the second RF path among frequencies supported by the electronic device 101 prior to other frequency and perform a camp-on based on the result of the search.

Figure 11:
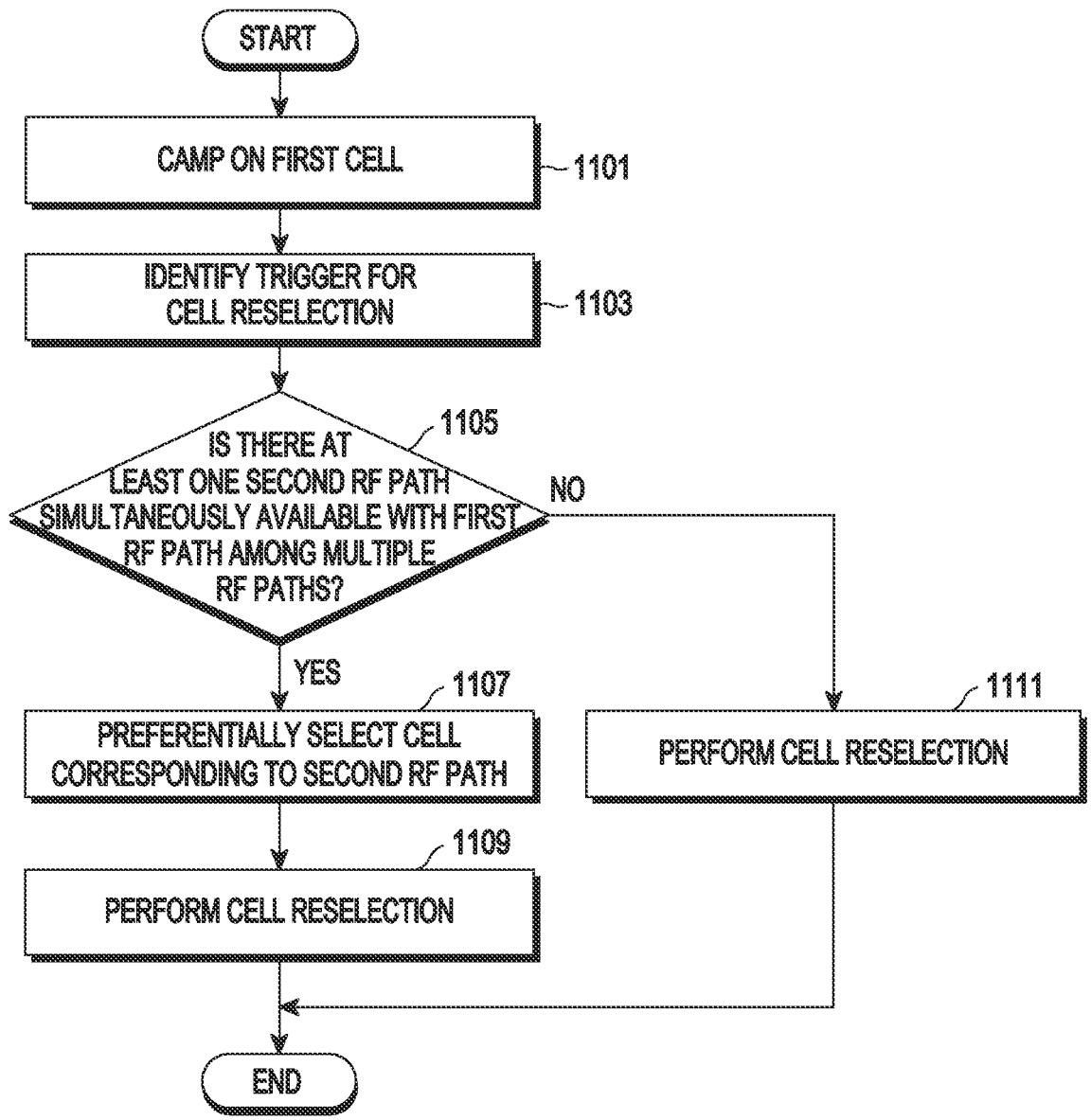
FIG. 11 is a flowchart illustrating an operation method of an electronic device according to an embodiment of the disclosure.

FIG. 11 is a flowchart illustrating an operation method of an electronic device according to an embodiment of the disclosure.

Referring to FIG. 11, an electronic device 101 (e.g., at least one of the processor 120, the first communication processor 212, the second communication processor 214, or the integrated communication processor 260) may camp on a first cell in association with the second SIM 341 in operation 1101. For example, the electronic device 101 may camp on the first cell using the RF path simultaneously available with the first SIM 331. Alternatively, the electronic device 101 may camp on the first cell using an RF path incapable of simultaneous use with the first SIM 331. The embodiment of FIG. 11 does not rely on whether the electronic device 101 is in the state of camping on the cell associated with the second SIM 341 using the RF path simultaneously available with the first RF path used by the first SIM 331.

Referring to FIG. 11, in operation 1103, the electronic device 101 may identify a trigger for cell reselection. For example, the electronic device 101 may detect, as a trigger, satisfaction of cell reselection criteria. The electronic device 101 may detect, synchronize, or monitor the intra-frequency, inter-frequency, and inter-RAT cell indicated by the first cell that is a serving cell. For example, if the result of measurement for the first cell meets a designated condition (e.g., Srxlev>$S_{nonIntraServeP}$ and Squal>$S_{nonIntraSearchQ}$), the electronic device 101 may perform a search on the inter-frequency layer having a higher cell reselection priority. The system information received from the serving cell may include a cell reselection priority for at least one neighbor cell (e.g., a cell reselection priority for the frequency associated with the neighbor cell).

The electronic device 101 may identify the cell reselection priority for the frequency measurable in the corresponding cell, based on system information. For example, if the result of measurement for the first cell does not meet the designated condition (e.g., Srxlev≤$S_{nonIntraServeP}$ or Squal≤$S_{nonIntraSearchQ}$), the electronic device 101 may perform a search on the inter-frequency layer having a higher cell reselection priority, the same cell reselection priority, or a lower cell reselection priority. For the frequency of the higher cell reselection priority, the electronic device 101 may determine that a trigger for reselection occurs, e.g., when Squal>$Thresh_{X,HighQ}$ at the frequency of the higher cell reselection priority or when Srxlev>$Thresh_{X,HighP}$ at the frequency of higher cell reselection priority. For the frequency having the same cell reselection priority, the electronic device 101 may determine that a trigger for reselection occurs based on the ranking. For the frequency of the low cell reselection priority, the electronic device 101 may determine that a trigger for reselection occurs, e.g., e.g., when Squal≤$Thresh_{Serving,\,LowQ}$ in the serving cell and Squal>$Thresh_{X\_LowQ}$ at the frequency of the lower cell reselection priority. For the frequency of the lower cell reselection priority, the electronic device 101 may determine that a trigger for reselection occurs, e.g., when Srxlev<$Thresh_{Serving,LowP}$ in the serving cell and Srxlev>$Thresh_{X\_LowP}$ at the frequency of lower cell reselection priority. It will be understood by those skilled in the art that the above triggers are merely exemplary, and that other or additional triggers (e.g., conditions associated with the time the triggers are met) may be applied.

In operation 1105, the electronic device 101 may determine whether there is at least one second RF path that may be simultaneously available with the first RF path available by the first SIM 331 among the plurality of RF paths. If at least one second RF path that may be simultaneously available exists (Yes in operation 1105), the electronic device 101 may select a cell supporting frequency corresponding to the second RF path in operation 1107. For example, the electronic device 101 may select a cell supporting frequency corresponding to the second RF path from among cells determined to meet the cell reselection criterion in operation 1103. In operation 1109, the electronic device 101 may perform a cell reselection operation, e.g., camp on the selected cell.

If at least one second RF path simultaneously available does not exist (No in operation 1105), the electronic device 101 may perform a general cell reselection operation in operation 1111. For example, if there is one cell determined to meet the cell reselection criterion in operation 1103, the electronic device 101 may select the corresponding cell. Alternatively, if there are a plurality of cells determined to meet the cell reselection criterion in operation 1103, the electronic device 101 may select a cell having the highest cell reselection priority.

In one example, as in the embodiment of FIG. 7, the electronic device 101 may support the low band (e.g., 5, 8, and 20), the mid band (1, 2, 3, and 4), the high band (7, 38, 39, 40, and 41), and the ultra-high bands (78 and 79). The electronic device 101 may use RF resources for each frequency band as shown in Table 4. The electronic device 101 may allocate an n78 band and a b7 band to the first SIM 331 to perform first communication. The electronic device 101 may use the RF resources of M3, M4, S3, and S5 corresponding to the n78 band based on the information in Table 4 and may use the RF resources of M2 and S2 corresponding to the b7 band. The RF resources available simultaneously with the RF resource of the SIM 331 may be M1, S1, and S4. Frequency bands corresponding to simultaneously available RF resources may be identified as 5, 8, and 20 of the low band and 1, 2, 3, and 4 of the mid band, and it may be identified that in the high band or ultra-high band, there is no band corresponding to simultaneously available RF resource.

If a cell reselection procedure is not applied, the electronic device 101 may perform cell reselection according to the cell reselection priority received from the network as shown in Table 10 and/or the priority set inside the electronic device 101.

TABLE 10

| | Cell reselection priority | | | | | | | | | | |
|---|---|---|---|---|---|---|---|---|---|---|---|
| | 7 | 6 | 6 | 5 | 4 | 4 | 3 | 2 | 2 | 1 | 1 | 1 |
| priority | 11 | 12 | 9 | 10 | 8 | 7 | 6 | 5 | 4 | 3 | 2 | 1 |
| band | 5 | 7 | 8 | 38 | 39 | 20 | 1 | 40 | 41 | 2 | 3 | 4 |

In Table 10, the bands are arranged in order from the highest value (7) to the lowest value (1) of the cell reselection frequency. Further, the priority of Table 10 reflects the priority based on, e.g., information mainly used in the area or country, or the requirements of the network operator as in Table 7, to which DSDA mode availability is not applied. The electronic device 101 may reselect a cell having the highest cell reselection priority among at least one cell that meets the cell reselection criterion.

If a cell reselection procedure is applied, the electronic device 101 may perform a cell search according to the priority as shown in Table 8 (e.g., priority set inside the electronic device 101). As described above, frequency bands corresponding to simultaneously available RF resources may be identified as 5, 8, and 20 of the low band and 1, 2, 3, and 4 of the mid band. The electronic device 101 may set a higher priority for bands 5, 8, 20, 1, 2, 3, and 4. The electronic device 101 may select a cell having the highest priority among at least one cell that meets the cell reselection criterion. If there is no cell capable of DSDA operation among at least one cell meeting the cell reselection criterion, the electronic device 101 may perform cell reselection based on cell reselection priority. Thus, the chance for cell reselection to be performed in the frequency band capable of DSDA mode operation increases, so that the possibility that the electronic device 101 operates in the DSDA mode may be higher than those of the related art.

The electronic device 101 may set the cell reselection priority supported by the frequency incapable of DSDA operation to the lowest level or adjust the cell reselection priority in a manner that subtracts a designated offset.

Figure 12:
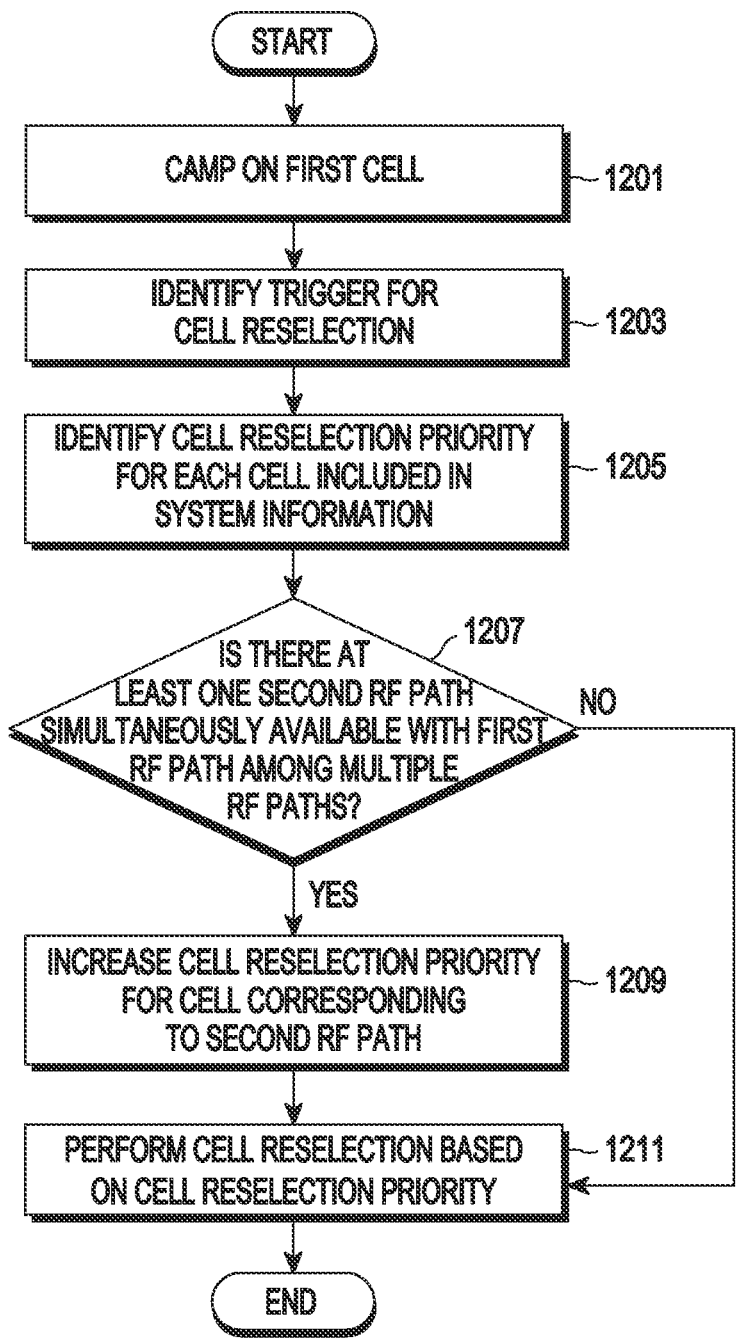
FIG. 12 is a flowchart illustrating an operation method of an electronic device according to an embodiment of the disclosure.

FIG. 12 is a flowchart illustrating an operation method of an electronic device according to an embodiment of the disclosure.

Referring to FIG. 12, an electronic device 101 (e.g., at least one of the processor 120, the first communication processor 212, the second communication processor 214, or the integrated communication processor 260) may camp on a first cell in association with the second SIM 341 in operation 1201. The embodiment of FIG. 12 does not rely on whether the electronic device 101 is in the state of camping on the cell associated with the second SIM 341 using the RF path simultaneously available with the first RF path used by the first SIM 331. In operation 1203, the electronic device 101 may identify a trigger for cell reselection. Since the trigger for cell reselection has been described with reference to FIG. 11, a redundant description thereof will be omitted. In operation 1205, the electronic device 101 may identify a cell reselection priority for each cell (or for each frequency) included in the system information.

Referring to FIG. 12, in operation 1207, the electronic device 101 may determine whether there is at least one second path that may be simultaneously available with the first path among the plurality of RF paths. If it is determined that at least one second path simultaneously available exists (Yes in operation 1207), the electronic device 101 may increase the cell reselection priority for the cell (or frequency) supported by the second path in operation 1209. For example, the electronic device 101 may add a preset offset to the cell reselection priority supported by the second path or adjust the cell reselection priority to a designated value (e.g., 7). In operation 1211, the electronic device 101 may perform cell reselection based on cell reselection priority.

If it is determined that at least one second path simultaneously available does not exist (No in operation 1207), the electronic device 101 may perform cell reselection based on the cell reselection priority included in the system information without adjusting the cell reselection priority as in operation 1209. In the embodiment of FIG. 12, the electronic device 101 may perform cell reselection using the cell reselection priority included in the system information without internally set priority.

Figure 13:
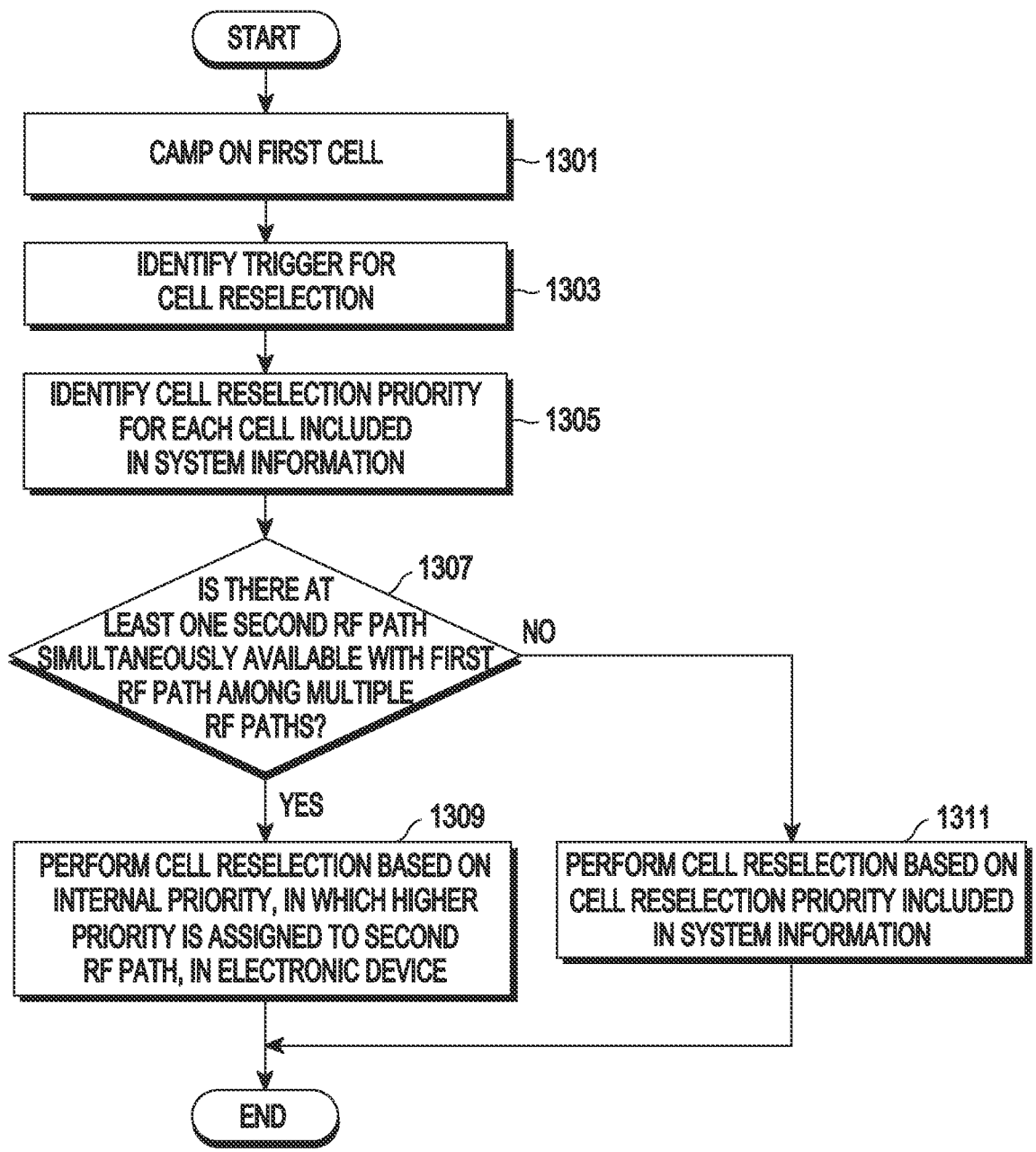
FIG. 13 is a flowchart illustrating an operation method of an electronic device according to an embodiment of the disclosure.

FIG. 13 is a flowchart illustrating an operation method of an electronic device according to an embodiment of the disclosure. The embodiment of FIG. 13 illustrates operations for the second SIM 341.

Referring to FIG. 13, an electronic device 101 (e.g., at least one of the processor 120, the first communication processor 212, the second communication processor 214, or the integrated communication processor 260) may camp on a first cell in association with the second SIM 341 in operation 1301. The embodiment of FIG. 13 does not rely on whether the electronic device 101 is in the state of camping on the cell associated with the second SIM 341 using the RF path simultaneously available with the first RF path used by the first SIM 331. In operation 1303, the electronic device 101 may identify a trigger for cell reselection. Since the trigger for cell reselection has been described with reference to FIG. 11, a redundant description thereof will be omitted. In operation 1305, the electronic device 101 may identify a cell reselection priority for each cell (or for each frequency) included in the system information.

In operation 1307, the electronic device 101 may determine whether there is at least one second path that may be simultaneously available with the first path among the plurality of RF paths. If it is determined that at least one second path simultaneously available exists (Yes in operation 1307), the electronic device 101 may perform cell reselection based on internal priority, in which higher priority is assigned to the second path in the electronic device 101, in operation 1309. For example, the electronic device 101 may give a higher internal priority to a cell capable of DSDA mode operation. If it is determined that at least one second path simultaneously available does not exist (No in operation 1307), the electronic device 101 may perform cell reselection based on the cell reselection priority included in the system information in operation 1311.

According to various embodiments of the disclosure, the electronic device 101 may allocate the data transmission/reception function to the first SIM 331 and the calling function to the second SIM 341. In this case, the calling function may be started on the second SIM 341. In this case, if the first SIM 331 is in the idle state or inactive state, the electronic device 101 may perform cell selection or cell reselection on the first SIM 331 to allow the first SIM 331 to operate in the DSDA mode with the second SIM 341.

Figure 14:
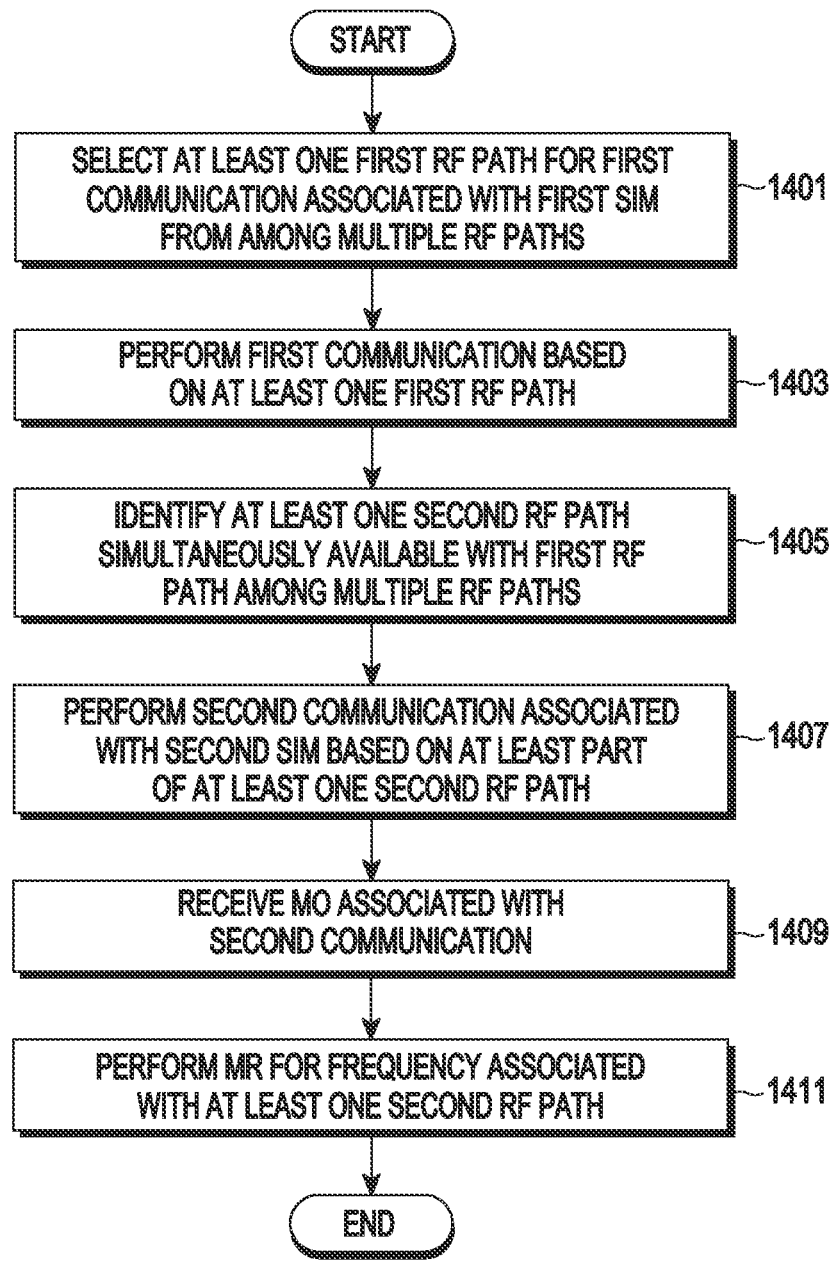
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, an electronic device 101 (e.g., at least one of the processor 120, the first communication processor 212, the second communication processor 214, or the integrated communication processor 260) may select at least one first path for first communication associated with the first SIM 331 from among a plurality of RF paths in operation 1401. In operation 1403, the electronic device 101 may perform first communication associated with the first SIM 331 based on at least one first path. In operation 1405, the electronic device 101 may select at least one second path that may be simultaneously available with the first path among the plurality of RF paths. In operation 1407, the electronic device 101 may perform second communication associated with the second SIM 341 based on at least some of at least one second path.

The electronic device 101 may receive a measurement object (MO) associated with the second communication in operation 1409. For example, the electronic device 101 may identify a measurement object included in the RRC reconfiguration message. The measurement object may include a measurement target frequency and a measurement report (MR) condition. The electronic device 101 may measure RSRP and/or RSRQ for the measurement target frequency and determine whether the measurement result meets the measurement report condition.

For example, the electronic device 101 may perform measurement on the frequency identified as capable of DSDA operation before the frequency identified as incapable of DSDA operation. Alternatively, the electronic device 101 may set the measurement period for the frequency identified as capable of DSDA operation to be shorter than the measurement period for the frequency identified as incapable of DSDA operation.

In operation 1411, the electronic device 101 may perform MR on the frequency associated with at least one second path. For example, if the electronic device 101 identifies that a measurement result at a frequency associated with at least one second path meets a measurement report condition, the electronic device 101 may perform MR on the corresponding frequency. If it is identified that the measurement report condition is met for a plurality of frequencies, the electronic device 101 may perform MR on the frequency associated with at least one second path among them prior to other frequency.

Figure 15:
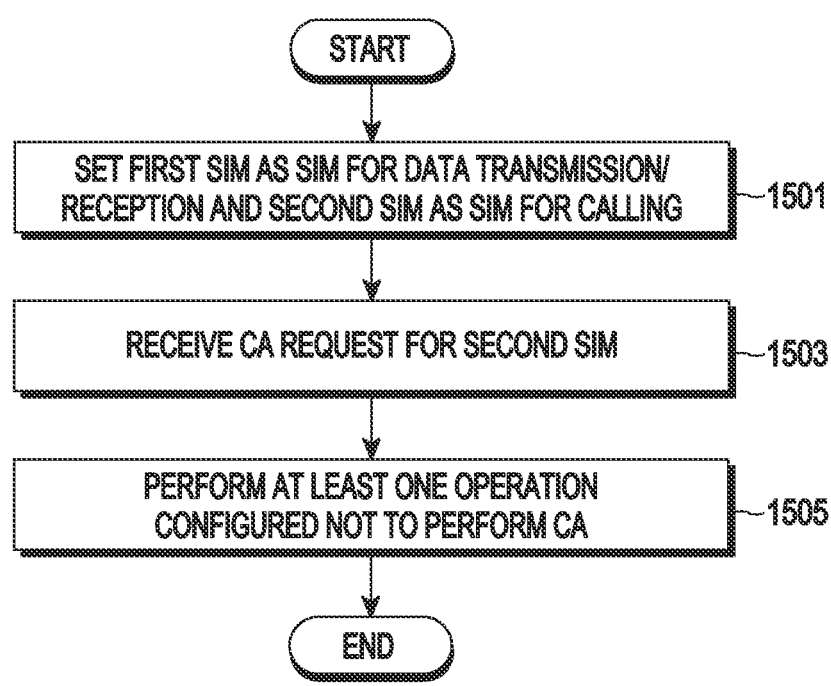
FIG. 15 is a flowchart illustrating an operation method of an electronic device according to an embodiment of the disclosure.

FIG. 15 is a flowchart illustrating an operation method of an electronic device according to an embodiment of the disclosure.

Referring to FIG. 15, an electronic device 101 (e.g., at least one of the processor 120, the first communication processor 212, the second communication processor 214, or the integrated communication processor 260) may set the first SIM 331 as a SIM for data transmission/reception and the second SIM 341 for a SIM for calling in operation 1501. In operation 1503, the electronic device 101 may receive a CA request for the second SIM 341 from the network. In operation 1505, the electronic device 101 may perform at least one operation configured not to perform CA. In one example, the electronic device 101 may receive a CA-related MO from a serving cell related to the second SIM 341. The electronic device 101 may not perform measurement corresponding to the MO even when receiving the CA-related MO related to the second SIM 341. In another example, the electronic device 101 may perform measurement corresponding to the MO and may not perform MR even when the measurement result meets the reporting condition. In another example, even when the electronic device 101 receives an RRC message for CA addition (e.g., an RRC reconfiguration message) from the serving cell related to the second SIM 341, the electronic device 101 may disregard it or may transmit a negative response (e.g., RRCConnectionReestablishmentRequest including reestablishmentCause of reconfigurationFailure). Accordingly, the electronic device 101 may control the second SIM 341 for calling to use a relatively small number of RF resources (or RF paths). The probability that the first SIM 331 and the second SIM 341 will operate in the DSDA mode may increase.

Figure 16:
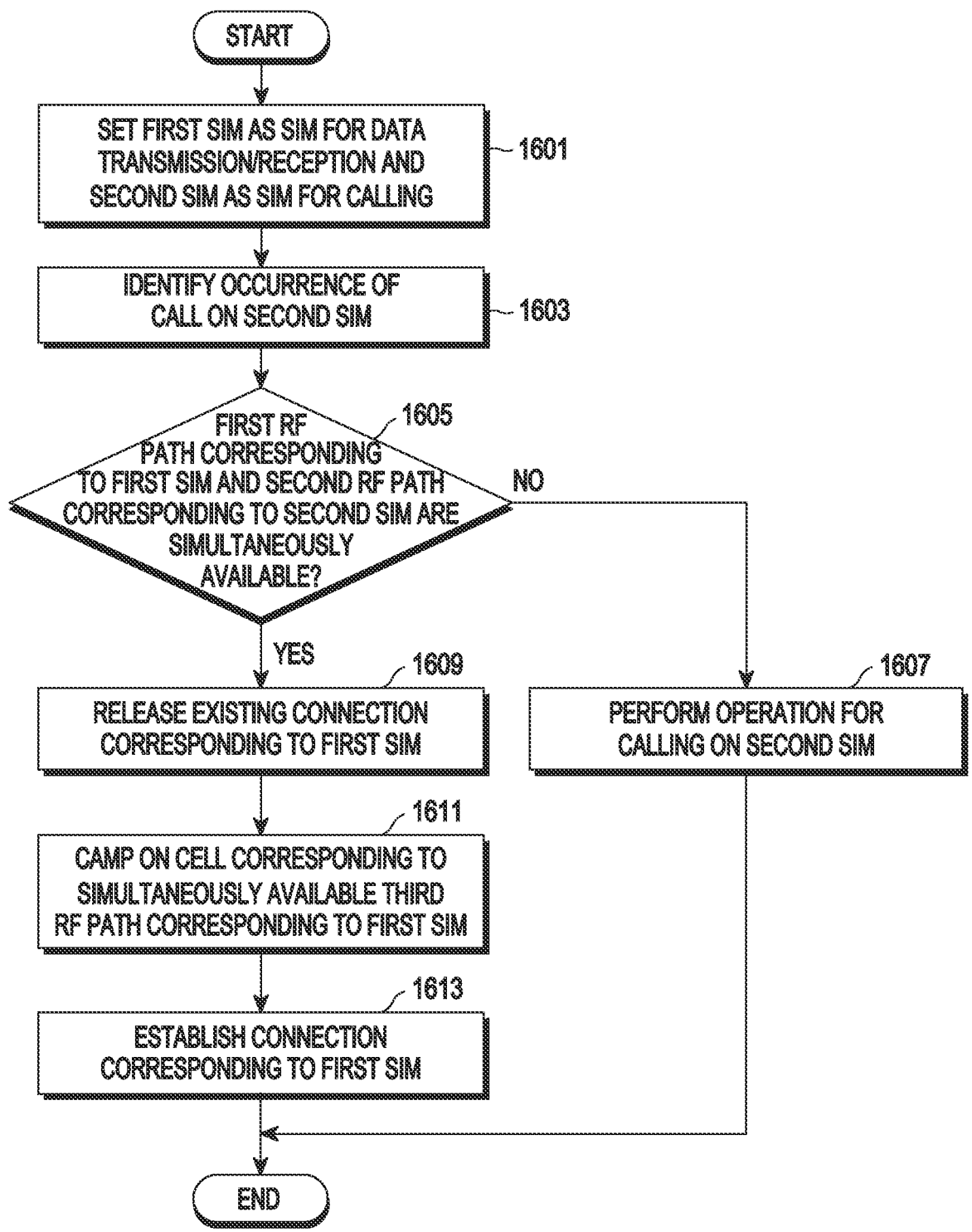
FIG. 16 is a flowchart illustrating an operation method of an electronic device according to an embodiment of the disclosure.

FIG. 16 is a flowchart illustrating an operation method of an electronic device according to an embodiment of the disclosure.

Referring to FIG. 16, an electronic device 101 (e.g., at least one of the processor 120, the first communication processor 212, the second communication processor 214, or the integrated communication processor 260) may set the first SIM 331 as a SIM for data transmission/reception and the second SIM 331 for a SIM for calling in operation 1601. It is assumed that the electronic device 101 performs first communication associated with the first SIM 331 through the first RF path and second communication associated with the second SIM 341 through the second RF path. Both the first SIM 331 and the second SIM 341 may be in the connected state. In operation 1603, the electronic device 101 may identify an occurrence of a call on the second SIM 341. In operation 1605, the electronic device 101 may determine whether the first RF path corresponding to the first SIM 331 and the second RF path corresponding to the second SIM are simultaneously available.

If it is determined that the first RF path and the second RF path are simultaneously available (Yes in operation 1605), then the electronic device 101 may perform an operation for calling on the second SIM 341 in operation 1607. If it is determined that simultaneous use of the first RF path and the second RF path is impossible (No in operation 1605), then the electronic device 101 may release the existing connection corresponding to the first SIM 331 in operation 1609. The electronic device 101 may perform operation 1609 at least partially simultaneously with the operation for calling on the second SIM 341. The electronic device 101 may determine a low layer fail situation as corresponding to the first SIM 331. As corresponding to the first SIM 331, the electronic device 101 may perform cell selection without performing an RRC reestablishment procedure.

In operation 1611, the electronic device 101 may camp on a cell support supporting frequency corresponding to a simultaneously available third RF path corresponding to the first SIM 331. The electronic device 101 may perform a cell selection operation to camp on a cell supporting frequency corresponding to the third RF path simultaneously available with the second SIM 341.

In operation 1613, the electronic device 101 may establish a connection corresponding to the first SIM 331. The electronic device 101 may then perform a tracking area update (TAU) procedure. If a cell capable of operating in the DSDA mode is not detected, the electronic device 101 may maintain the connection corresponding to the first SIM 331, rather than releasing the connection. In this case, the electronic device 101 may operate in the DSDS mode. If the first SIM 331 of the electronic device 101 is not in the connected state but in the idle state or in the inactive state, the electronic device 101 may camp on the cell supporting frequency corresponding to the third RF path simultaneously available, corresponding to the first SIM 331 and may then perform operations 1613 and 1615.

According to various embodiments of the disclosure, an electronic device may comprise at least one processor configured to select at least one first RF path from among a plurality of RF paths supported by the electronic device, perform first communication associated with a first SIM based on the at least one first RF path, identify at least one second RF path simultaneously available with the at least one first RF path among the plurality of RF paths, and perform second communication associated with a second SIM based on at least part of the at least one second RF path. A first baseband signal associated with the first SIM may be converted into a first RF signal associated with the first SIM and a first communication signal corresponding to the first RF signal may be radiated based on at least one first hardware corresponding to the at least one first RF path, and a second baseband signal associated with the second SIM may be converted into a second RF signal associated with the second SIM and a second communication signal corresponding to the second RF signal may be radiated based on at least one second hardware corresponding to the at least one second RF path.

The at least one processor may be configured to, as at least part of performing the second communication associated with the second SIM based on the at least part of the at least one second RF path, identify at least one frequency corresponding to the at least one second RF path based on association information between each of the plurality of RF paths and each of a plurality of frequencies, and perform the second communication based on at least one of the at least one identified frequency. The at least one of the at least one identified frequency may correspond to the at least part of the at least one second RF path.

The at least one processor may be configured to, as at least part of performing the second communication based on the at least one of the at least one identified frequency, in an idle or inactive state of the second SIM, perform a cell search on the at least one identified frequency among information for frequencies previously stored in the electronic device prior to other frequency, select a frequency meeting a cell selection criterion as the at least one of the at least one identified frequency as a result of the cell search, and camp on a cell supporting the at least one of the at least one frequency.

The at least one processor may be configured to, as at least part of performing the second communication based on the at least one of the at least one identified frequency, in the idle or inactive state of the second SIM, based on a failure to identify the frequency meeting the cell selection criterion as a result of performing the cell search on the at least one identified frequency among the information for the frequencies previously stored in the electronic device prior to other frequency, perform the cell search on the at least one identified frequency among all of frequencies supported by the electronic device prior to other frequency, select a frequency meeting a cell selection criterion as the at least one of the at least one identified frequency as a result of the cell search, and camp on a cell supporting the at least one of the at least one frequency.

The at least one processor may be configured to, as at least part of performing the second communication based on the at least one of the at least one identified frequency, in the idle or inactive state of the second SIM, based on a failure to identify the frequency meeting the cell selection criterion as a result of performing the cell search on the at least one identified frequency among the information previously stored in the electronic device prior to other frequency, identify that a frequency other than the at least one identified frequency meets the cell selection criterion among the information for the frequencies previously stored in the electronic device, and perform the second communication based on the frequency other than the at least one identified frequency.

The at least one processor may be configured to, as at least part of performing the second communication based on the at least one of the at least one identified frequency, while camping on a serving cell for the second SIM, select a frequency meeting a cell reselection criterion among the at least one identified frequency as the at least one of the at least one identified frequency, and camp on a cell supporting the at least one of the at least one frequency.

The at least one processor may be configured to, as at least part of performing the second communication based on the at least one of the at least one identified frequency, while camping on a serving cell for the second SIM, identify a frequency meeting a cell reselection criterion, adjust a cell reselection priority of the at least one identified frequency among frequencies meeting the cell reselection criterion, and perform cell reselection based on the cell reselection priority of each of the frequencies meeting the cell reselection criterion.

The at least one processor may be configured to, as at least part of performing the second communication associated with the second SIM based on the at least part of the at least one second RF path, in a connected state of the second SIM, receive a measurement object of the second SIM from a serving cell camped-on for the second SIM, and perform first measurement on the at least one identified frequency among frequencies included in a report object and perform second measurement on a remaining frequency among the frequencies included in the report object. A measurement period of the first measurement may be shorter than a measurement period of the second measurement.

The at least one processor may be configured to, as at least part of performing the second communication associated with the second SIM based on the at least part of the at least one second RF path, in a connected state of the second SIM, receive a measurement object of the second SIM from a serving cell camped-on for the second SIM, and refrain from performing measurement and/or measurement reporting on a frequency other than the at least one identified frequency among frequencies included in a report object.

The first SIM may be allocated for data communication, and the second SIM may be allocated for calling.

The at least one processor may be configured to identify an occurrence of a call associated with the second SIM, and release a connection established for the first SIM and perform cell selection for the first SIM, based on incapability of simultaneous use of the at least one first RF path corresponding to the first SIM and the at least one second RF path corresponding to the second SIM at a time of identifying the occurrence of the call. The cell selection based on the first SIM may be performed based on a frequency corresponding to an RF path simultaneously available with the at least one second RF path.

According to various embodiments of the disclosure, an electronic device may comprise at least one processor configured to select at least one first frequency from among a plurality of frequencies supported by the electronic device, perform first communication associated with a first SIM based on the at least one first frequency, identify at least one second frequency simultaneously available with the at least one first frequency among the plurality of frequencies based on information indicating whether frequency combinations by two of the plurality of frequencies supported by the electronic device are simultaneously available, and perform second communication associated with a second SIM based on at least one of the at least one second frequency.

The at least one processor may be configured to, as at least part of performing the second communication associated with the second SIM based on the at least one of the at least one second frequency, in an idle or inactive state of the second SIM, perform a cell search on the at least one second frequency among information for frequencies previously stored in the electronic device prior to other frequency, select a frequency meeting a cell selection criterion as the at least one of the at least one second frequency as a result of the cell search, and camp on a cell supporting the at least one of the at least one second frequency.

The at least one processor may be configured to, as at least part of performing the second communication based on the at least one of the at least one second frequency, in the idle state of the second SIM, based on a failure to identify the frequency meeting the cell selection criterion as a result of performing the cell search on the at least one second frequency among the information for the frequencies previously stored in the electronic device prior to other frequency, perform the cell search on the at least one second frequency among all of the plurality of frequencies prior to other frequency, select a frequency meeting a cell selection criterion as the at least one of the at least one second frequency as a result of the cell search, and camp on a cell supporting the at least one of the at least one frequency.

The at least one processor may be configured to, as at least part of performing the second communication based on the at least one of the at least one second frequency, in the idle or inactive state of the second SIM, based on a failure to identify the frequency meeting the cell selection criterion as a result of performing the cell search on the at least one second frequency among the information for the frequencies previously stored in the electronic device prior to other frequency, identify that a frequency other than the at least one second frequency meets the cell selection criterion among the information for the frequencies previously stored in the electronic device, and perform the second communication based on the frequency other than the at least one second frequency.

The at least one processor may be configured to, as at least part of performing the second communication based on the at least one of the at least one frequency, while camping on a serving cell for the second SIM, select a frequency meeting a cell reselection criterion among the at least one second frequency as the at least one of the at least one second frequency, and camp on a cell supporting the at least one of the at least one frequency.

The at least one processor may be configured to, as at least part of performing the second communication based on the at least one of the at least one second frequency, while camping on a serving cell for the second SIM, identify a frequency meeting a cell reselection criterion, adjust a cell reselection priority of the at least one second frequency among frequencies meeting the cell reselection criterion, and perform cell reselection based on the cell reselection priority of each of the frequencies meeting the cell reselection criterion.

The at least one processor may be configured to, as at least part of performing the second communication based on the at least one of the at least one second frequency, in a connected state of the second SIM, receive a measurement object of the second SIM from a serving cell camped-on for the second SIM, and perform first measurement on the at least one second frequency among frequencies included in a report object and perform second measurement on a remaining frequency among the frequencies included in the report object. A measurement period of the first measurement may be shorter than a measurement period of the second measurement.

The at least one processor may be configured to, as at least part of performing the second communication associated with the second SIM based on the at least one of the at least one second frequency, in a connected state of the second SIM, receive a measurement object of the second SIM from a serving cell camped-on for the second SIM, and refrain from performing measurement and/or measurement reporting on a frequency other than the at least one second frequency among frequencies included in a report object.

The first SIM may be allocated for data communication, and the second SIM may be allocated for calling. The at least one processor may be configured to identify an occurrence of a call associated with the second SIM, and release a connection established for the first SIM and perform cell selection for the first SIM, based on incapability of simultaneous use of the at least one first frequency corresponding to the first SIM and the at least one second RF frequency corresponding to the second SIM at a time of identifying the occurrence of the call. The cell selection based on the first SIM may be performed based on a frequency simultaneously available with the at least one second frequency.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
   memory storing instructions;
   at least one processor;
   a radio frequency integrated circuit (RFIC) electrically connected to the at least one processor;
   a first RF front end (RFFE) electrically connected to the RFIC; and
   a second RFFE electrically connected to the RFIC,
   wherein the instructions, when executed by the at least one processor, cause the electronic device to:
   select at least one first radio frequency (RF) path from among a plurality of RF paths supported by the electronic device,
   perform first communication associated with a first subscriber identity module (SIM) based on the at least one first RF path,
   identify at least one second RF path simultaneously available with the at least one first RF path among the plurality of RF paths,
   identify at least one frequency corresponding to the at least one second RF path based on association information between each of the plurality of RF paths and each of a plurality of frequencies,
   perform a scan based on setting a higher priority to the at least one identified frequency than other frequency, and
   perform second communication associated with a second SIM based on at least one of the at least one identified frequency, wherein the at least one of the at least one identified frequency corresponds to at least part of the at least one second RF path,
   wherein a first baseband signal associated with the first SIM is converted into a first RF signal associated with the first SIM and a first communication signal corresponding to the first RF signal is radiated based on at least one first hardware corresponding to the at least one first RF path,
   wherein a second baseband signal associated with the second SIM is converted into a second RF signal associated with the second SIM and a second communication signal corresponding to the second RF signal is radiated based on at least one second hardware corresponding to the at least one second RF path,
   wherein the at least one first hardware comprises the RFIC and the first RFFE, and
   wherein the at least one second hardware comprises the RFIC and the second RFFE.

2. The electronic device of claim 1, wherein the instructions, when executed by the at least one processor, cause the electronic device to:
   as at least part of performing the second communication associated with the second SIM based on the at least one of the at least one identified frequency:
      perform, in an idle or inactive state of the second SIM, a cell search on the at least one identified frequency among information for frequencies previously stored in the electronic device prior to other frequency,
      select a frequency meeting a cell selection criterion as the at least one of the at least one identified frequency as a result of the cell search, and
      camp on a cell supporting the at least one of the at least one identified frequency.

3. The electronic device of claim 2, wherein the instructions, when executed by the at least one processor, cause the electronic device to:
   as at least part of performing the second communication based on the at least one of the at least one identified frequency, in the idle or inactive state of the second SIM, based on a failure to identify the frequency meeting the cell selection criterion as a result of performing the cell search on the at least one identified frequency among the information for the frequencies previously stored in the electronic device prior to other frequency:
      perform the cell search on the at least one identified frequency among all of frequencies supported by the electronic device prior to other frequency,
      select a frequency meeting a cell selection criterion as the at least one of the at least one identified frequency as a result of the cell search, and
      camp on a cell supporting the at least one of the at least one identified frequency.

4. The electronic device of claim 2, wherein the instructions, when executed by the at least one processor, cause the electronic device to:
   as at least part of performing the second communication based on the at least one of the at least one identified frequency, in the idle or inactive state of the second SIM, based on a failure to identify the frequency meeting the cell selection criterion as a result of performing the cell search on the at least one identified frequency among the information previously stored in the electronic device prior to other frequency:

identify that a frequency other than the at least one identified frequency meets the cell selection criterion among the information for the frequencies previously stored in the electronic device, and perform the second communication based on the frequency other than the at least one identified frequency.

5. The electronic device of claim 1, wherein the instructions, when executed by the at least one processor, cause the electronic device to:
as at least part of performing the second communication associated with the second SIM based on the at least one of the at least one identified frequency:
select, while camping on a serving cell for the second SIM, a frequency meeting a cell reselection criterion among the at least one identified frequency as the at least one of the at least one identified frequency, and
camp on a cell supporting the at least one of the at least one frequency.

6. The electronic device of claim 1, wherein the instructions, when executed by the at least one processor, cause the electronic device to:
as at least part of performing the second communication associated with the second SIM based on the at least one of the at least one identified frequency:
identify, while camping on a serving cell for the second SIM, a frequency meeting a cell reselection criterion,
adjust a cell reselection priority of the at least one identified frequency among the frequency meeting the cell reselection criterion, and
perform cell reselection based on the cell reselection priority of each of the frequency meeting the cell reselection criterion.

7. The electronic device of claim 1,
wherein the instructions, when executed by the at least one processor, cause the electronic device to:
as at least part of performing the second communication associated with the second SIM based on the at least one of the at least one identified frequency:
receive, in a connected state of the second SIM, a measurement object of the second SIM from a serving cell camped-on for the second SIM, and
perform first measurement on the at least one identified frequency among frequencies included in a report object and perform second measurement on a remaining frequency among the frequencies included in the report object,
wherein a measurement period of the first measurement is shorter than a measurement period of the second measurement.

8. The electronic device of claim 1, wherein the instructions, when executed by the at least one processor, cause the electronic device to:
as at least part of performing the second communication associated with the second SIM based on the at least one of the at least one identified frequency:
receive, in a connected state of the second SIM, a measurement object of the second SIM from a serving cell camped-on for the second SIM, and
refrain from performing measurement and/or measurement reporting on a frequency other than the at least one identified frequency among frequencies included in a report object.

9. The electronic device of claim 1, wherein the first SIM is allocated for data communication, and the second SIM is allocated for calling.

10. The electronic device of claim 9, wherein the instructions, when executed by the at least one processor, cause the electronic device to:
identify an occurrence of a call associated with the second SIM, and
release a connection established for the first SIM and perform cell selection for the first SIM, based on incapability of simultaneous use of the at least one first RF path corresponding to the first SIM and the at least one second RF path corresponding to the second SIM at a time of identifying the occurrence of the call,
wherein the cell selection based on the first SIM is performed based on a frequency corresponding to an RF path simultaneously available with the at least one second RF path.

11. An electronic device, comprising:
memory storing instructions;
at least one processor;
a radio frequency integrated circuit (RFIC) electrically connected to the at least one processor;
a first RF front end (RFFE) electrically connected to the RFIC; and
a second RFFE electrically connected to the RFIC, wherein the instructions, when executed by the at least one processor, cause the electronic device to:
select at least one first frequency from among a plurality of frequencies supported by the electronic device,
perform first communication associated with a first subscriber identity module (SIM) based on the at least one first frequency,
identify at least one second frequency simultaneously available with the at least one first frequency among the plurality of frequencies based on information indicating whether frequency combinations by two of the plurality of frequencies supported by the electronic device are simultaneously available,
perform a scan based on setting a higher priority to the at least one second frequency than other frequency, and
perform second communication associated with a second SIM based on at least one of the at least one second frequency,
wherein the first communication based on the at least one first frequency is performed through a first RF path including the RFIC and the first RFFE, and
wherein the second communication based on the at least one second frequency is performed through a second RF path including the RFIC and the second RFFE.

12. The electronic device of claim 11, wherein the instructions, when executed by the at least one processor, cause the electronic device to:
as at least part of performing the second communication associated with the second SIM based on the at least one of the at least one second frequency:
perform, in an idle or inactive state of the second SIM, a cell search on the at least one second frequency among information for frequencies previously stored in the electronic device prior to other frequency,
select a frequency meeting a cell selection criterion as the at least one of the at least one second frequency as a result of the cell search, and
camp on a cell supporting the at least one of the at least one second frequency.

13. The electronic device of claim 12, wherein the instructions, when executed by the at least one processor, cause the electronic device to:

as at least part of performing the second communication associated with the second SIM based on the at least one of the at least one second frequency, in the idle state or inactive of the second SIM, based on a failure to identify the frequency meeting the cell selection criterion as a result of performing the cell search on the at least one second frequency among the information for the frequencies previously stored in the electronic device prior to other frequency:
- perform the cell search on the at least one second frequency among all of the plurality of frequencies prior to other frequency,
- select a frequency meeting a cell selection criterion as the at least one of the at least one second frequency as a result of the cell search, and
- camp on a cell supporting the at least one of the at least one second frequency.

14. The electronic device of claim 12, wherein the instructions, when executed by the at least one processor, cause the electronic device to:
as at least part of performing the second communication based on the at least one of the at least one second frequency, in the idle or inactive state of the second SIM, based on a failure to identify the frequency meeting the cell selection criterion as a result of performing the cell search on the at least one second frequency among the information for the frequencies previously stored in the electronic device prior to other frequency:
- identify that a frequency other than the at least one second frequency meets the cell selection criterion among the information for the frequencies previously stored in the electronic device, and
- perform the second communication based on the frequency other than the at least one second frequency.

15. The electronic device of claim 11, further comprising:
the first SIM; and
the second SIM.

16. The electronic device of claim 11, wherein the at least one processor comprises an integrated communications processor.

17. The electronic device of claim 16, further comprising:
a first switch electrically connected to the first RFFE;
a second switch electrically connected to the second RFFE;
a first plurality of antennas electrically connected to the first switch; and
a second plurality of antennas electrically connected to the second switch.

18. A method for communication in an electronic device, the method comprising:
selecting at least one first radio frequency (RF) path from among a plurality of RF paths supported by the electronic device;
performing first communication associated with a first subscriber identity module (SIM) based on the at least one first RF path;
identifying at least one second RF path simultaneously available with the at least one first RF path among the plurality of RF paths;
identifying at least one frequency corresponding to the at least one second RF path based on association information between each of the plurality of RF paths and each of a plurality of frequencies;
performing a scan based on setting a higher priority to the at least one identified frequency than other frequency; and
performing second communication associated with a second SIM based on at least one of the at least one identified frequency, wherein the at least one of the at least one identified frequency corresponds to at least part of the at least one second RF path,
wherein a first baseband signal associated with the first SIM is converted into a first RF signal associated with the first SIM and a first communication signal corresponding to the first RF signal is radiated based on at least one first hardware corresponding to the at least one first RF path, and
wherein a second baseband signal associated with the second SIM is converted into a second RF signal associated with the second SIM and a second communication signal corresponding to the second RF signal is radiated based on at least one second hardware corresponding to the at least one second RF path.

* * * * *